(12) United States Patent
Kataoka et al.

(10) Patent No.: US 11,080,234 B2
(45) Date of Patent: Aug. 3, 2021

(54) COMPUTER READABLE RECORDING MEDIUM FOR INDEX GENERATION

(71) Applicant: FUJITSU LIMITED, Kawasaki (JP)

(72) Inventors: Masahiro Kataoka, Kamakura (JP); Masao Ideuchi, Hachioji (JP); Hazuki Abe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 441 days.

(21) Appl. No.: 15/488,685

(22) Filed: Apr. 17, 2017

(65) Prior Publication Data
US 2017/0300507 A1 Oct. 19, 2017

(30) Foreign Application Priority Data

Apr. 18, 2016 (JP) .............................. JP2016-083243

(51) Int. Cl.
| | | |
|---|---|---|
| *G06F 16/13* | (2019.01) | |
| *G06F 16/33* | (2019.01) | |
| *G06F 16/31* | (2019.01) | |
| *G06F 40/284* | (2020.01) | |

(52) U.S. Cl.
CPC .......... *G06F 16/137* (2019.01); *G06F 16/316* (2019.01); *G06F 16/3344* (2019.01); *G06F 40/284* (2020.01)

(58) Field of Classification Search
CPC ... G06F 16/137; G06F 16/316; G06F 16/3344
See application file for complete search history.

(56) References Cited

U.S. PATENT DOCUMENTS

| | | | |
|---|---|---|---|
| 8,831,995 B2* | 9/2014 | Holler .................. | G06F 16/172 705/51 |
| 2008/0270363 A1* | 10/2008 | Hunt ................... | G06F 16/2462 |
| 2011/0055585 A1* | 3/2011 | Lee ........................ | H04L 9/0844 713/183 |
| 2013/0318124 A1* | 11/2013 | Ohta .................... | G06F 16/3347 707/780 |
| 2014/0229484 A1 | 8/2014 | Kataoka et al. | |

(Continued)

FOREIGN PATENT DOCUMENTS

| | | |
|---|---|---|
| CN | 102024047 A | 4/2011 |
| CN | 102567421 A | 7/2012 |

(Continued)

OTHER PUBLICATIONS

EESR mailed on Oct. 28, 2020 for the corresponding European patent application No. 20196907.8.

(Continued)

*Primary Examiner* — Matthew J Ellis
(74) *Attorney, Agent, or Firm* — Xsensus LLP

(57) ABSTRACT

An index generation device 100 generates key presence information for a plurality of input files when lexical analysis on the plurality of input files are executed, the key presence information including information whether each of a plurality of keys is present in the plurality of input files and presence positions of the respective plurality of keys when the respective plurality of keys are present in the plurality of input files. The index generation device 100 generates index information about the keys and the positions for the plurality of input files based on the key presence information.

2 Claims, 15 Drawing Sheets

(56) References Cited

U.S. PATENT DOCUMENTS

| | | | | |
|---|---|---|---|---|
| 2015/0052170 | A1* | 2/2015 | Murata | G06F 16/152 707/769 |
| 2015/0350311 | A1* | 12/2015 | Arai | H04L 67/16 709/203 |
| 2016/0056839 | A1 | 2/2016 | Kataoka et al. | |
| 2016/0171031 | A1* | 6/2016 | Kataoka | G06F 16/313 707/741 |

FOREIGN PATENT DOCUMENTS

| | | |
|---|---|---|
| JP | 63-189934 | 8/1988 |
| JP | 63-271525 | 11/1988 |
| JP | 8-180066 A | 7/1996 |
| WO | WO 2013/038527 A1 | 3/2013 |
| WO | 2013/069149 A1 | 5/2013 |

OTHER PUBLICATIONS

Notice of Reasons for Refusal issued in Japanese Application 2016-083243 dated Jan. 7, 2020.
205.143.205.150 et al: "Bit array", Wikipedia, Dec. 14, 2015 (Dec. 14, 2015), pp. 1-7, XP055641403, Retrieved from the Internet: URL:https://en.wikipedia.org/w/index.php? title=Bit_array&oldid=695200373 [retrieved on Nov. 12, 2019].
Wikipedia Contributors: "Bloom filter", Wikipedia: The Free Encyclopedia, Mar. 22, 2014 (Mar. 22, 2014), XP055423856, Retrieved from the Internet: URL:https://en.wikipedia.org/w/index.php? title=Bloom filter&oldid=600744371 [retrieved on Nov. 10, 2017].
European Summons to attend oral proceedings pursuant to Rule 115(1) EPC, dated Nov. 21, 2019, issued in corresponding European Patent Application No. 17166792.6.
CN-OA mailed on Sep. 27, 2020 in the corresponding Chinese patent application No. 20170249150.X.
Chinese Office Action dated Mar. 26, 2020, issued in corresponding Chinese Patent Application No. 201710249150.X.
Keisuke Nishida, "Technology underlining Google", The inner world of giant system, 2008, 24 pgs., (with English translation).
K. Sekiguchi, "Introduction to Apache Lucene", Constructing Java open source full-text search system, 2006, 49 pgs., (with English translation).
Japanese Office Action dated Mar. 3, 2020 in the corresponding Japanese Patent Application No. 2016-083243.
Extended European Search Report dated Aug. 24, 2017 in Patent Application No. 17166792.6.
Kengo Fujioka, et al "Application of Bitmap Index to information Retrieval," Proceedings of the 17$^{th}$ International Conference on World Wide Web, XP058289451, www 2008, pp. 1109-1110.
Anonymous, "Inverted index—Wikipedia," XP055355061, 2016, 3 Pages.
Kesheng Wu, et al. "Optimizing Bitmap Indices with Efficient Compression," ACM transactions on Database Systems, vol. 31, No. 1, XP058232605, 2006, pp. 1-38.
European Office Action dated Apr. 3, 2019, issued in European Patent Application No. 17 166 792.6.

\* cited by examiner

FIG.2
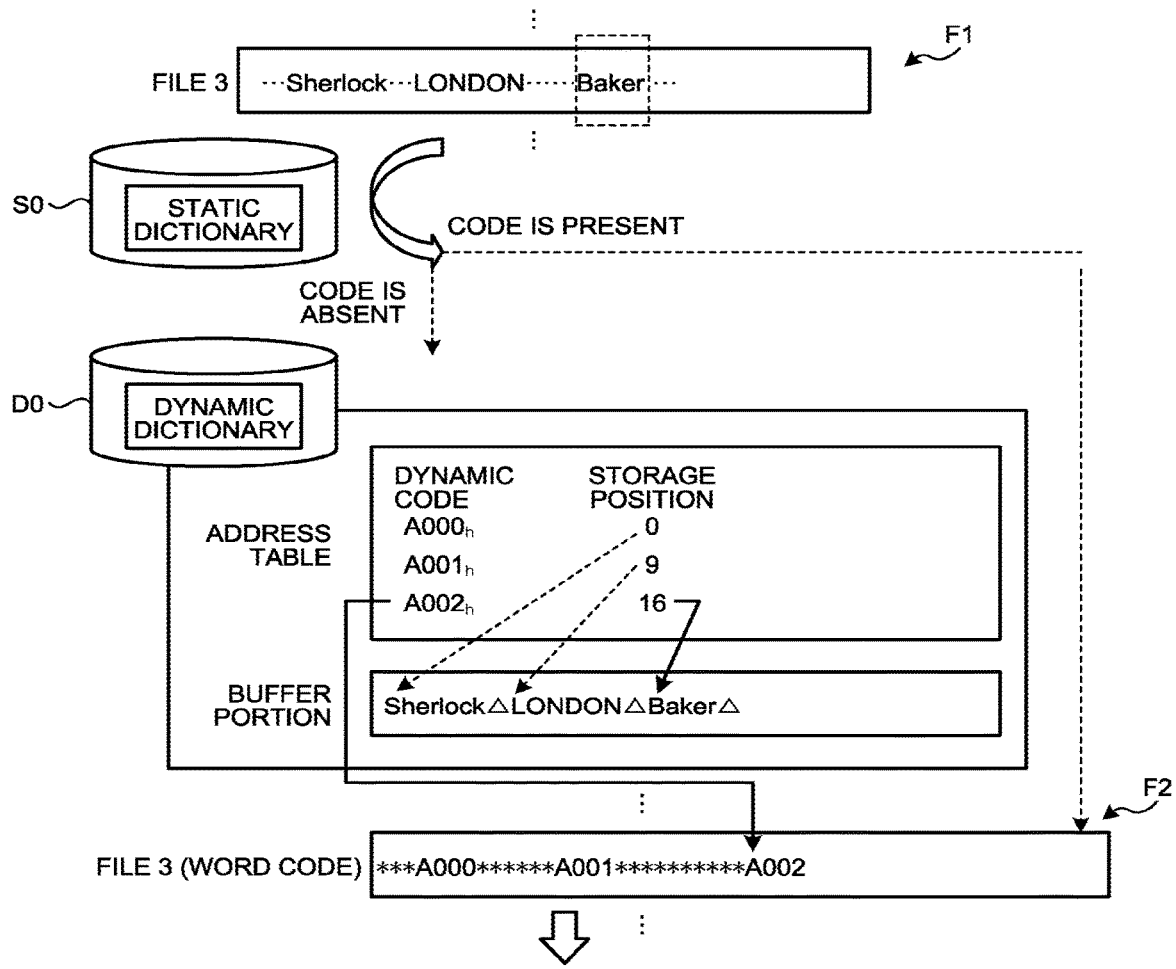
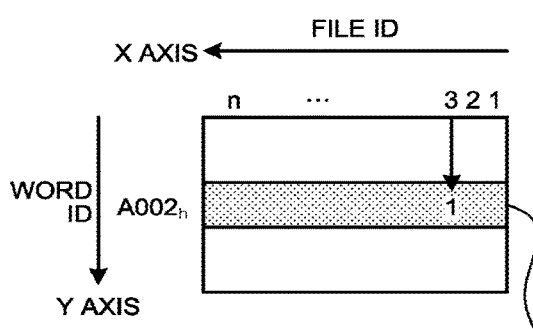
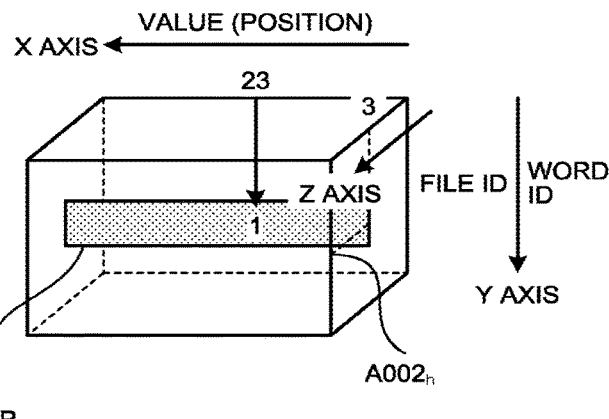

FIG.5
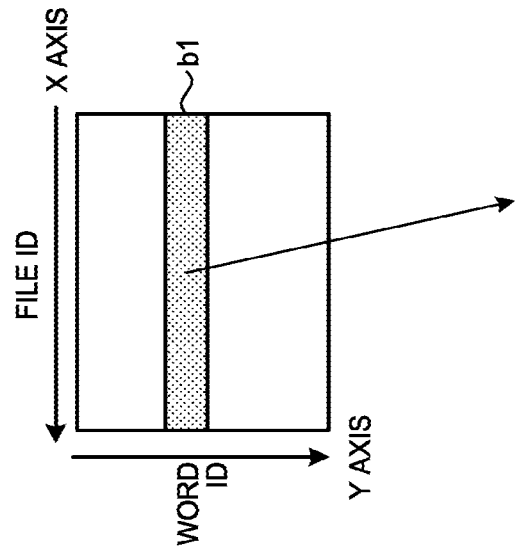
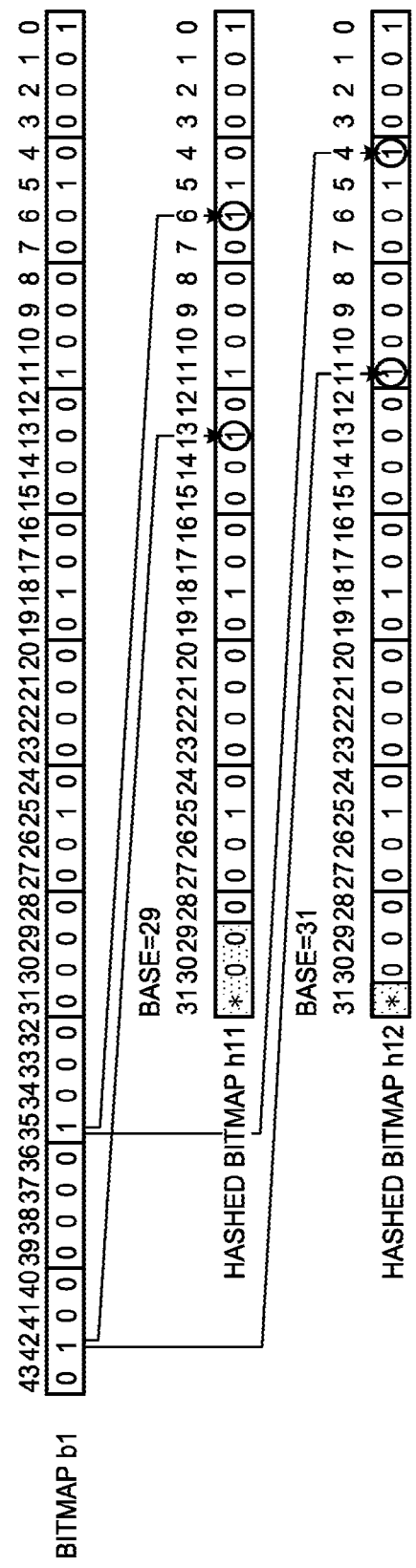

COMPUTER READABLE RECORDING MEDIUM FOR INDEX GENERATION

CROSS-REFERENCE TO RELATED APPLICATION(S)

This application is based upon and claims the benefit of priority of the prior Japanese Patent Application No. 2016-083243, filed on Apr. 18, 2016, the entire contents of which are incorporated herein by reference.

FIELD

The embodiment discussed herein is related to an index generation program and the like.

BACKGROUND

In order to increase a speed of retrieval of text data, a bitmap index formed by indexing presence or absence of each character contained in the text data for each file has been known (for example, see International Publication Pamphlet No. WO 2013/038527).

Furthermore, there is a technique for generating an index indicating storage positions of records for keys using contents of data items contained in the records as the keys and utilizing the index for searching a database (for example, see Japanese Laid-open Patent Publication No. 63-189934).

A technique for generating a pointer table index corresponding to words has been known (for example, see Keisuke NISHIDA, *Google wo sasaeru gijutsu* (*Technology that Supports Google*), Gijutsu-Hyohron Co., Ltd., Apr. 25, 2008). The technique will be explained with reference to FIG. 1. FIG. 1 is a diagram illustrating a reference example of pointer table index generation processing. As illustrated in FIG. 1, with the technique, words are extracted from individual document files, and indexes that correspond to document IDs, word IDs, and appearance positions thereof are generated and are collected, and the collected index is sorted by the word ID. In this manner, a transposed index, that is, a pointer table index in which the document IDs and the appearance positions correspond to the word IDs as references is generated.

Another conventional technique is, for example, disclosed in Japanese Laid-open Patent Publication No. 63-271525. Furthermore, still another technique is, for example, seen in Hiroshi SEKIGUCHI, *ApacheLucene nyumon* (*Introduction to ApacheLucene*), Gijutsu-Hyohron Co., Ltd., Jun. 25, 2006.

There is, however, a problem in that an index containing files, keys, and appearance positions thereof are incapable of being easily generated in a compression format with one pass. From another point of view, there is a problem in that it is difficult to search for combinations of the files and the appearance positions thereof for the keys.

For example, the conventional bitmap index is an index containing keys and files when characters are used as the keys but is not an index containing the files, the keys, and appearance positions thereof. Generation and compression of the index are independent of each other and are performed with two passes. Accordingly, the technique is incapable of easily generating the index containing the files, the keys, and the appearance positions thereof in the compression format with one pass.

Since the bitmap index contains no information about appearance positions, in order to search for combinations of the files and the appearance positions thereof for the keys, the target files are specified with the index, and then, the appearance positions of the keys in the files are checked by referring to the respective files. Accordingly, it is difficult to search for the combinations of the files and the appearance positions thereof for the keys.

On the other hand, with the technique for generating the pointer table index, the index generation processing, the collection processing, the sort processing and the transposition processing are therefore repeated with three passes in a huge cloud environment every time a document file is updated or added because the document files contain different words. Furthermore, the index is compressed with one pass. Accordingly, although the pointer table index contains the files, the keys, and the appearance positions thereof, the technique is incapable of easily generating the pointer table index for the document files in the compression format with one pass.

Although the above-mentioned problems occur when the contents of the data items are used as the keys, the problems occur not only in the case when the contents of the data items are used as the keys but also in the case when words or characters are used as the keys in the same manner.

SUMMARY

According to an aspect of an embodiment, a non-transitory computer readable recording medium stores therein an index generation program. The program causes a computer to execute a process. The process includes generating key presence information for a plurality of input files when lexical analysis on the plurality of input files are executed, the key presence information including information whether each of a plurality of keys is present in the plurality of input files and presence positions of the respective plurality of keys when the respective plurality of keys are present in the plurality of input files. The process includes generating index information about the keys and the positions for the plurality of input files based on the key presence information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING

FIG. 2 is a diagram illustrating an example of flow of bitmap index generation processing according to an embodiment;

FIG. 5 is a diagram illustrating an example of hashed index generation processing in the embodiment;

DESCRIPTION OF EMBODIMENTS

Figure 1:
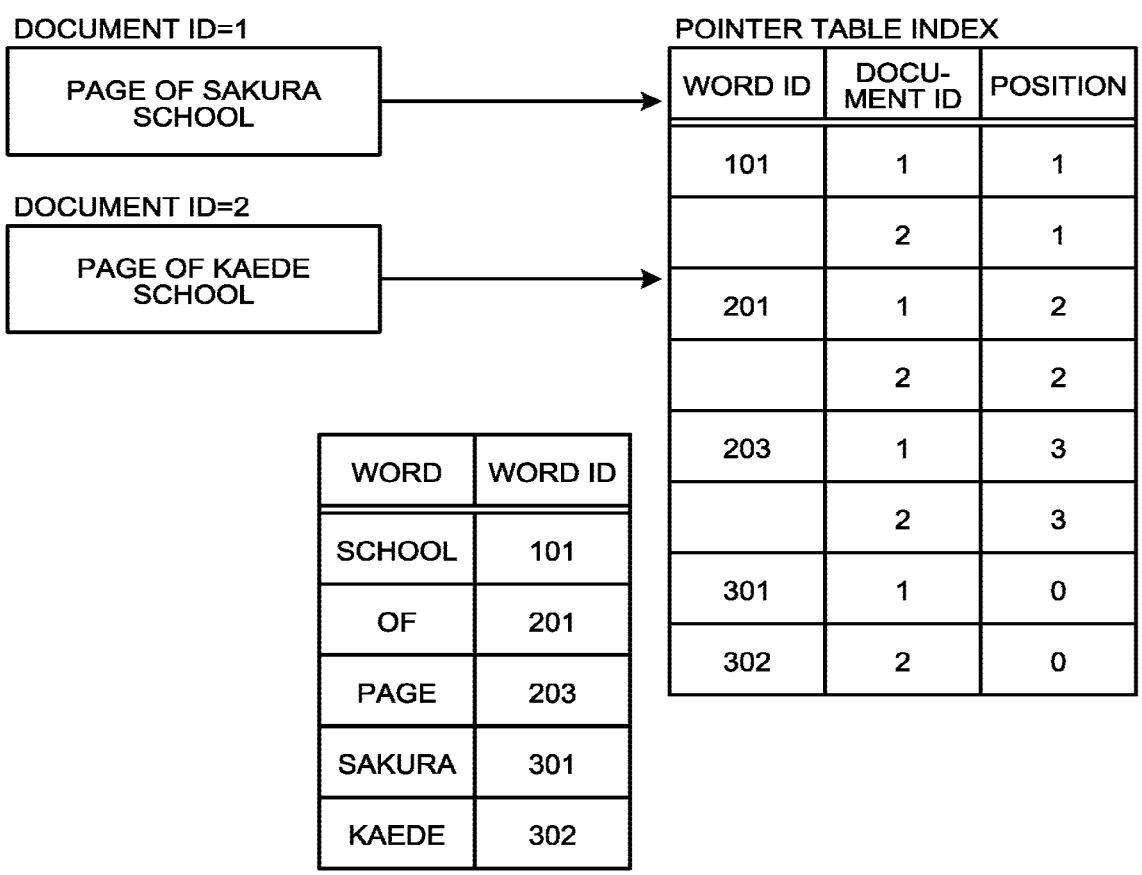
FIG. 1 is a diagram illustrating a reference example of pointer table index generation processing.

Preferred embodiments of the present invention will be explained with reference to accompanying drawings. Note that the embodiments do not limit the invention.

Example of Bitmap Index Generation in Embodiment

FIG. 2 is a diagram illustrating an example of flow of bitmap index generation processing in the embodiment. As illustrated in FIG. 2, the bitmap index generation processing generates pieces of information about presence or absence of a plurality of words and positions of the words when the words are present for a plurality of input files in lexical analysis on the respective files. The bitmap index generation processing generates a bitmap index of the words and the positions of the words for the respective files based on the pieces of generated information. Hereinafter, the bitmap index generation processing is referred to as "index generation processing".

An example of the index generation processing will be described below. An index generation device that executes the index generation processing, for example, loads one file 3 contained in a file F1 as a coding target into a storage region. Note that "3" of the file 3 indicates that the file ID is "3".

The index generation device reads out the file 3 from the storage region and performs the lexical analysis on the read file 3. The lexical analysis referred to herein is division of a file that is not coded into words.

The index generation device compares a static dictionary S0 and character strings of words and determines whether there are codes corresponding to the character strings of the words in the static dictionary S0. The determination processing may be alternatively performed in the following manner. That is, the index generation device compares a bit filter specifying character strings of words that can be coded using the static dictionary S0 and the character strings of the words and determines whether the character strings of the words hit the bit filter. The bit filter referred to herein indicates a filter specifying the character strings of the words that can be coded using the static dictionary S0. When there are the codes corresponding to the character strings of the words in the static dictionary S0, the index generation device codes the character strings of the words into codes (static codes) that correspond to the character strings of the words based on the static dictionary S0.

When there are no codes corresponding to the character strings of the words in the static dictionary S0, the index generation device determines whether the character strings of the words have been registered in a dynamic dictionary D0. When the character strings of the words have not been registered in the dynamic dictionary D0, the index generation device registers the character strings of the words in the dynamic dictionary D0, and codes the registered character strings of the words into dynamic codes that correspond to the registered character strings of the words based on the dynamic dictionary D0. When the character strings of the words have been registered in the dynamic dictionary D0, the index generation device codes the character strings of the words into the dynamic codes that correspond to the character strings of the words based on the dynamic dictionary D0.

The static dictionary S0 indicates a dictionary provided by specifying appearance frequencies of words appearing in documents based on general English dictionaries, Japanese language dictionaries, textbooks, and the like, and assigning shorter codes to words with higher appearance frequencies. In the static dictionary S0, the static codes as codes corresponding to the respective words are previously registered. On the other hand, the dynamic dictionary D0 indicates a dictionary in which words that are not registered in the static dictionary and dynamically assigned dynamic codes (codes) correspond to each other. Examples of the words that are not registered in the static dictionary S0 include words (low-frequency words) with low appearance frequencies, unknown words, numerical values, time, and tags. The unknown words referred to herein are not registered in the static dictionary S0 and have characteristics of repeated appearance in a document to be coded. In the dynamic dictionary D0, the words corresponding to the dynamic codes are registered in a buffer portion in the appearance order of the words that are not registered in the static dictionary S0. Note that the dynamic dictionary D0 will be described in detail later.

The index generation device stores the word codes assigned by coding in a coded data area for the file 3 in a coded file F2.

The index generation device generates pieces of information about the word codes assigned by coding and positions of the words indicated by the word codes for the file 3. The index generation device sets presence or absence of the words indicated by the word codes for the file 3 to a two-dimensional bitmap index BI1 based on the pieces of generated information. The index generation device sets the word codes and the positions of the words indicated by the word codes for the file 3 to a three-dimensional bitmap index BI2 based on the pieces of generated information.

The two-dimensional bitmap index BI1 referred to herein is an index for full-text retrieval and a bit string formed by coupling pointers specifying the words and bits indicating presence or absence of the words in the individual target files. That is, the two-dimensional bitmap index BI1 indicates a bitmap formed by indexing the presence or absence of the words contained in the file for the individual files. In retrieval processing, the bitmap can be used as an index indicating whether a word as a retrieval target is contained based on ON and OFF of the bits. As the pointers specifying the words, for example, the codes of the words are employed. The codes of the words indicate the static codes and the word codes and have the same meaning as the word IDs. It is to be noted that the pointers specifying the words may be, for example, the words themselves. That is, the two-dimensional bitmap index BI1 is formed by gathering the bitmaps for the individual words indicated by the pointers specifying the words. As illustrated in FIG. 2, an X-axis of the two-dimensional bitmap index BI1 indicates the file ID and a Y-axis thereof indicates the word ID. In other words, the two-dimensional bitmap index BI1 represents presence or absence of the words indicated by the word IDs for the respective files indicated by the file IDs.

The three-dimensional bitmap index BI2 referred to herein is a bitmap index formed by adding the positions of the words in the individual target files to the two-dimensional bitmap index BI1. That is, the three-dimensional bitmap index BI2 is a bitmap formed by indexing the presence positions of the words contained in the file for the individual files. As illustrated in FIG. 2, an X-axis of the three-dimensional bitmap index BI2 indicates a Value (position), a Y-axis thereof indicates the word ID, and a Z-axis thereof indicates the file ID. In other words, the three-dimensional bitmap index BI2 represents the positions of the words indicated by the word IDs for the respective files indicated by the file IDs.

Processing when the index generation device generates the bitmap indexes for the file 3 will be described. " . . . Sherlock . . . LONDON . . . Baker . . . " is stored in a text file of the file 3. It is assumed that a character string "Sherlock" of a word, a character string "LONDON" of a word, and a character string "Baker" of a word have not been registered in the static dictionary S0.

The index generation device performs the lexical analysis on the file 3 to acquire "Sherlock", "LONDON", and "Baker". Processing of generating indexes for "Baker" among the acquired character strings of the words will be described as an example. It is assumed that the character string "Sherlock" of the word and the character string "LONDON" of the word have been registered in the dynamic dictionary D0.

The index generation device determines whether the character string "Baker" of the word has been registered in the dynamic dictionary D0 because there is no code corresponding to the character string "Baker" of the word in the static dictionary S0. The index generation device registers the character string "Baker" of the word in the dynamic dictionary D0 because the character string "Baker" of the word has not been registered in the dynamic dictionary D0. Then, the index generation device codes the registered character string "Baker" of the word into a dynamic code "A002$_h$" that corresponds to the character string of the word based on the dynamic dictionary D0.

The index generation device stores the word code "A002$_h$" assigned by coding in the coded data area for the file 3 in the coded file F2.

Subsequently, the index generation device generates pieces of information about the word code "A002$_h$" assigned by coding and the position of the word "Baker" indicated by the word code for the file 3. In this example, the position of the word "Baker" for the file 3 is assumed to be "23".

Then, the index generation device sets the presence or absence of the word indicated by the word code "A002$_h$" for the file 3 to the two-dimensional bitmap index BI1 based on the pieces of generated information. The two-dimensional bitmap index BI1 depicts a bitmap corresponding to the word ID "A002$_h$" of the "Baker". ON, that is, "1" of a binary number as presence or absence of the word for the file indicated by the file ID "3" is set to the bitmap. When there is no word in the file, OFF as presence or absence of the word for the file is set to the bitmap corresponding to the word ID indicated by the word.

The index generation device sets the word code "A002$_h$" and the position "23" of the word indicated by the word code for the file 3 is set to the three-dimensional bitmap index BI2 based on the pieces of generated information. The three-dimensional bitmap index BI2 depicts a bitmap corresponding to the word ID "A002$_h$" of the "Baker" and the file ID "3". ON, that is, "1" of a binary number is set to a bit corresponding to the Value (position) "23" in the bitmap. When there is no word at a predetermined position in the file, OFF is set to a bit corresponding to the predetermined position in the bitmap corresponding to the word ID indicated by the word and the file ID indicated by the file.

Thus, the index generation device codes the words that undergo the lexical analysis on the file 3 in order and generates the two-dimensional and three-dimensional bitmap indexes BI1 and BI2 based on the pieces of information about the word codes provided by coding and the positions of the words.

Example of Bitmap Index

Figure 3:
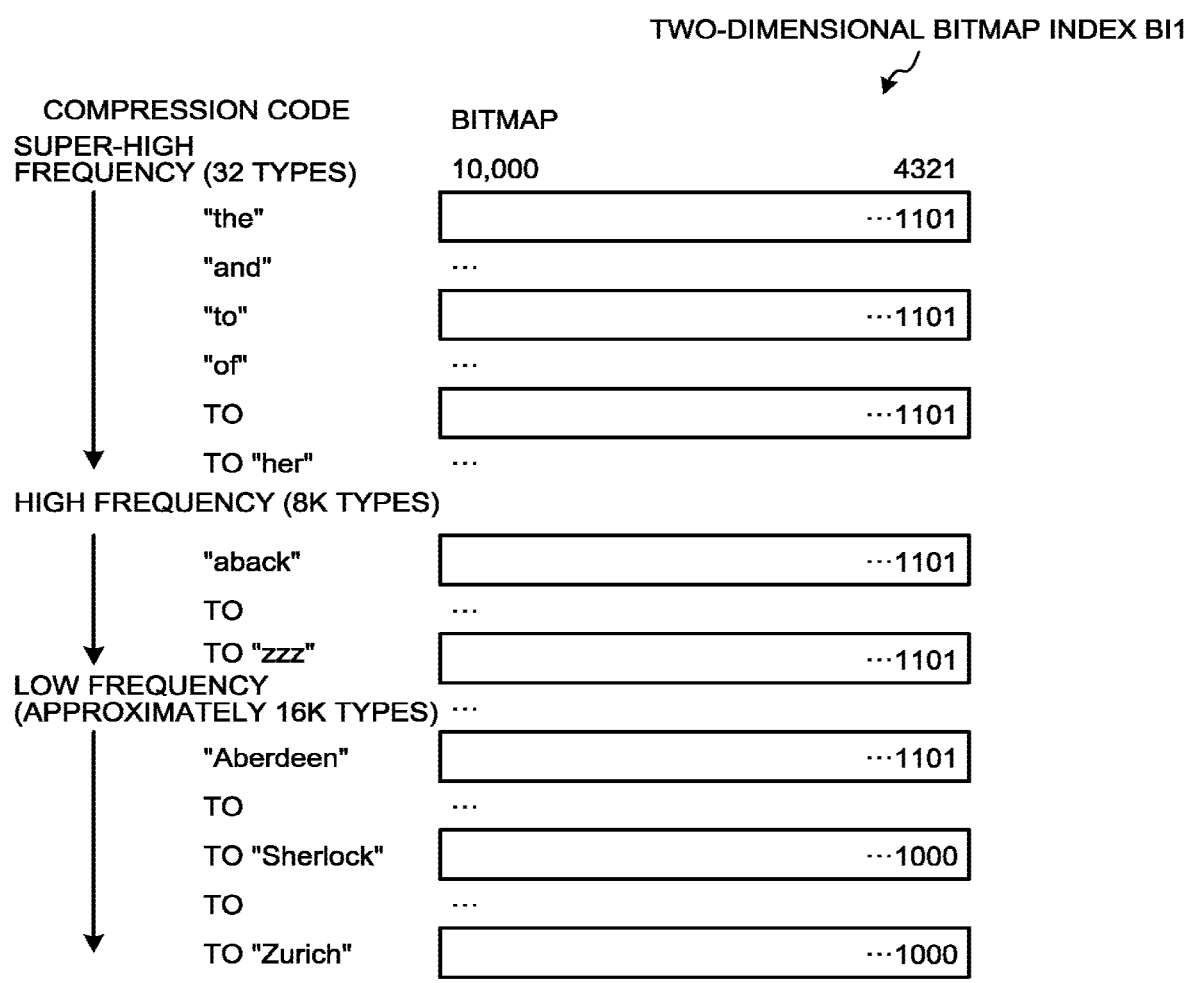
FIG. 3 is a diagram illustrating an example of a bitmap index in the embodiment.

Next, an example of the two-dimensional bitmap index will be described with reference to FIG. 3. FIG. 3 is a diagram illustrating an example of the bitmap index in the embodiment. As illustrated in FIG. 3, the two-dimensional bitmap index BI1 makes bitmaps correspond to respective compression codes (corresponding to the word IDs) for words with super-high frequencies, words with high frequencies, and words with low frequencies. The bitmaps are code bit strings representing compressed files containing the words with super-high frequencies, the words with high frequencies, and the words with low frequencies. Individual bits of the bitmaps represent the presence or absence of the words with super-high frequencies, the words with high frequencies, and the words with low frequencies in the individual files.

The two-dimensional bitmap index BI1 makes the bitmaps correspond to, for example, 32 types of words with super-high frequencies, 8K (8,000) types of words with high frequencies, and approximately 16K (16,000) types of words with low frequencies. The words with super-high frequencies indicate words with high appearance frequencies when the appearance frequencies of the individual words are tallied in a file group for appearance frequency tally. The words with super-high frequencies are, for example, words up to top 32 in rank of the appearance frequency in the file group for appearance frequency tally. The words with high frequencies are words up to top 8,000 in rank of the appearance frequency in the file group for appearance frequency tally. The words with low frequencies are words of lower than 24,000th in rank of the appearance frequency in the file group for appearance frequency tally and are numeric character strings or words extracted from the files to be coded. Examples of the words with low frequencies include technical words, new words, and unknown words. The technical words referred to herein are commonly used in certain specific academic fields, businesses, and the like and have characteristics of repeated appearance in the files to be coded. The new words are newly created words such as buzzwords and have characteristics of repeated appearance in the files to be coded. The unknown words are neither of the technical words nor the new words and have characteristics of repeated appearance in the files to be coded.

For example, an effective first line in the two-dimensional bitmap index BI1 depicts that a bitmap for a word "the" indicated by the compression code is " . . . 1101". The bitmap represents files containing the compression code of the "the". The bitmap " . . . 1101" represents that a file 1 contains "the" because "1" is stored in a 1st bit, a file 2 does not contain "the" because "0" is stored in a 2nd bit, and a file 3 contains "the" because "1" is stored in a 3rd bit. Furthermore, the bitmap " . . . 1101" represents that a file 4 contains "the" because "1" is stored in a 4th bit. The bitmap " . . . 1101" also represents whether a file 5 and subsequent other files contain "the".

Although not illustrated in the drawing, the three-dimensional bitmap index BI2 makes bitmaps correspond to the respective word IDs and file IDs. The bitmaps are code bit strings representing positions of the words in the compressed files when the compressed files contain the words. Individual bits of the bitmaps represent presence or absence of the words at the respective positions in the compressed files.

Example of Dynamic Dictionary

Figure 4:
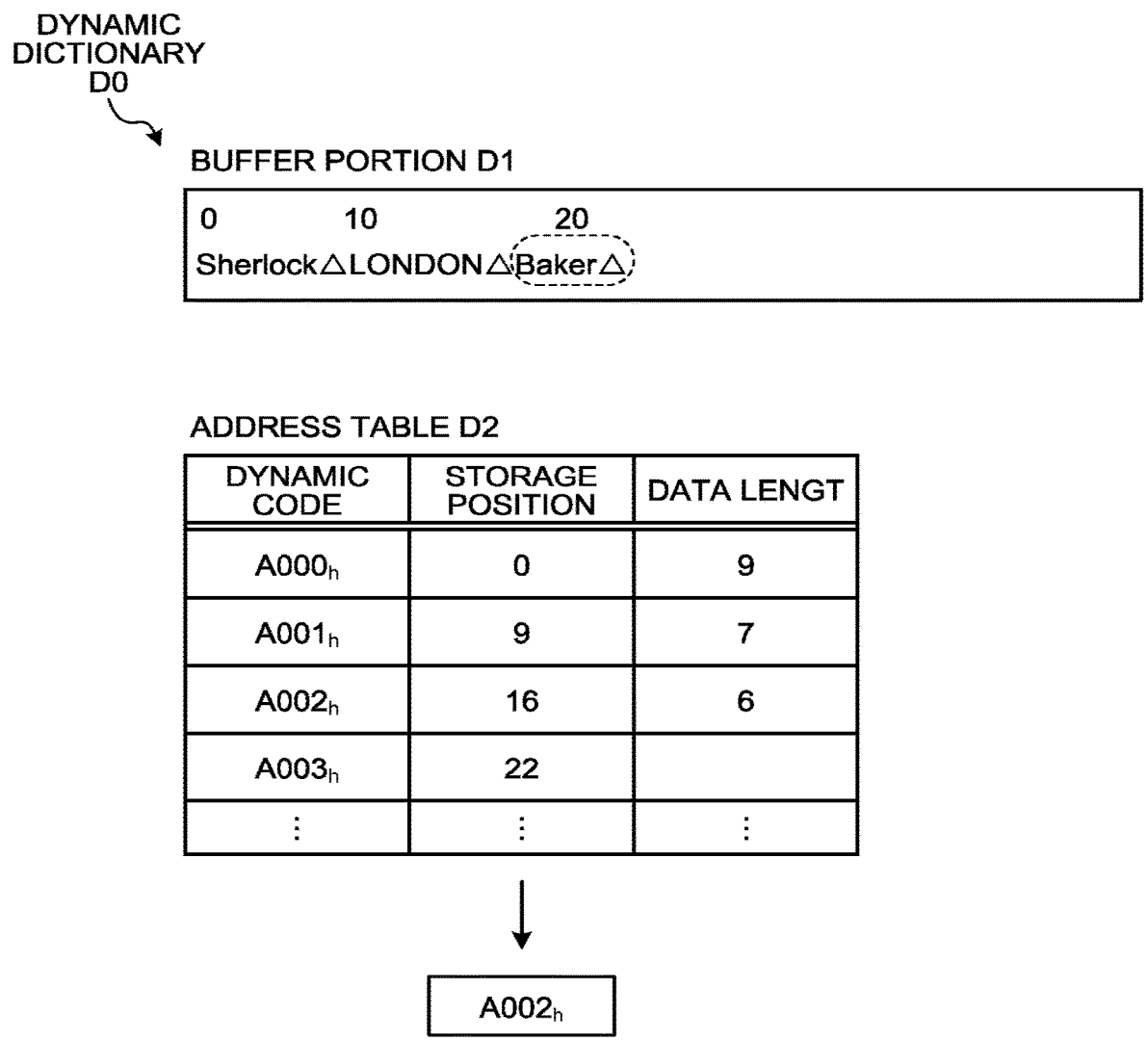
FIG. 4 is a diagram illustrating an example of a dynamic dictionary in the embodiment.

FIG. 4 is a diagram illustrating an example of the dynamic dictionary in the embodiment. The dynamic dictionary D0 illustrated in FIG. 4 contains a buffer portion D1 and an address table D2. The buffer portion D1 stores therein character strings. The address table D2 holds dynamic codes, storage positions, and data lengths in a corresponding manner. The dynamic codes are codes having a previously defined fixed length and are, for example, the compression codes. The dynamic codes are assigned in the order of registration of the character strings of the words. The dynamic codes are codes starting from "A" in hexadecimal and having a fixed length of 2 bytes. The storage positions indicate positions of the character strings stored in the buffer portion D1. The data lengths indicate the lengths (lengths in byte) of the character strings stored in the buffer portion D1.

The case in which the dynamic code is assigned to, for example, the character string "Baker" will be described. The index generation device stores the character string "Baker" in the buffer portion D1. The index generation device registers the storage position at which the character string is stored and the stored data length in the address table D2. The index generation device registers "16" as the storage position and "6" as the data length in the address table D2, in this example.

The index generation device assigns, as the compression codes, the dynamic codes in the address table D2, corresponding to the character strings. In this example, the index generation device assigns the corresponding dynamic code "A002$_h$" to the character string "Baker".

Example of Hashed Index Generation Processing in Embodiment

Next, an example of processing of hashing the two-dimensional bitmap index will be described with reference to FIG. 5. FIG. 5 is a diagram illustrating an example of hashed index generation processing in the embodiment.

As illustrated in FIG. 5, the index generation device generates a plurality of hashed bitmaps provided by applying hash functions to respective bitmaps corresponding to the word IDs. The index generation device hashes the individual bitmaps based on, as an example, hash values (bases) of 29 and 31 while a 32-bit register is supposed. To be specific, the index generation device sets, for a hashed bitmap based on one base, values of individual bits of a bitmap corresponding to a word ID to positions matching with remainders calculated by dividing the positions of the individual bits of the bitmap by the base. The positions of the individual bits of the bitmap correspond to the respective file IDs. As an example, the index generation device sets, for a hashed bitmap h11 based on the base 29, values of individual bits of a bitmap b1 to positions matching with remainders calculated by dividing the positions of the individual bits of the bitmap b1 by the base 29. A bit value "1" at a position of a 35th bit of the bitmap b1 is set to a 6th bit of the hashed bitmap h11. A bit value "1" at a position of a 42nd bit of the bitmap b1 is set to a 13th bit of the hashed bitmap h11. The index generation device sets, for a hashed bitmap h12 based on the base 31, the values of the individual bits of the bitmap b1 to positions matching with remainders calculated by dividing the positions of the individual bits of the bitmap b1 by the base 31. The bit value "1" at the position of the 35th bit of the bitmap b1 is set to a 4th bit of the hashed bitmap h12. The bit value "1" at the position of the 42nd bit of the bitmap b1 is set to an 11th bit of the hashed bitmap h12. That is, the index generation device sets the individual bits from a 0th bit of the bitmap in the order from the 0th bit to a (base-1)th bit of the hashed bitmap. Then, the index generation device returns to the 0th bit of the hashed bitmap again and sets values calculated by an OR operation with the values that have been already set to the hashed bitmap. As a result, the index generation device generates the hashed bitmaps h11 and h12 for the bitmap b1. In this manner, the index generation device generates the hashed bitmaps for the bitmaps corresponding to the respective word IDs indicating the words. Consequently, the index generation device generates a two-dimensional hashed index HI1 provided by gathering the generated hashed bitmaps.

The index generation device also generates a plurality of hashed bitmaps by applying the hash functions to the bitmaps of the three-dimensional bitmap index BI2 in the same manner as for the bitmaps of the two-dimensional bitmap index BI1. Then, it is sufficient that the index generation device generates a three-dimensional hashed index HI2 provided by gathering the individually generated hashed bitmaps. Hereinafter, the hash values (bases) are assumed to be 29 and 31, as an example.

Example of Configuration of Coded File

Figure 6:
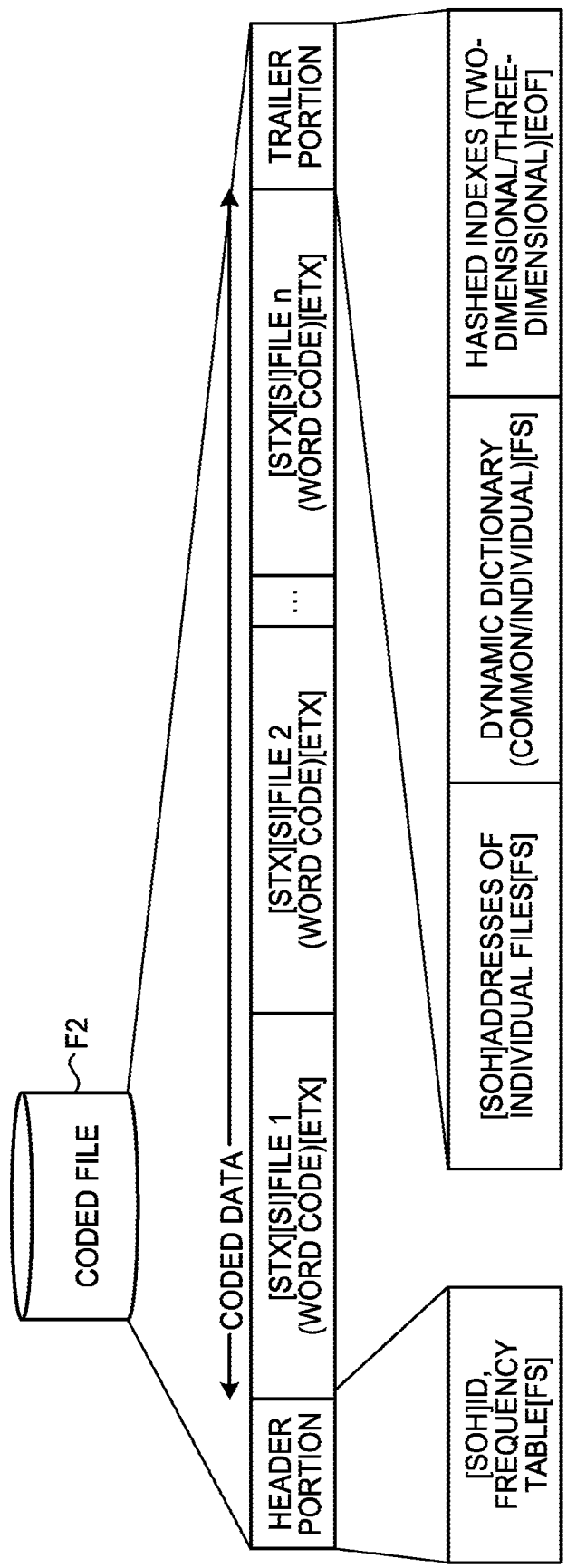
FIG. 6 is a diagram illustrating an example of the configuration of a coded file.

FIG. 6 is a diagram illustrating an example of the configuration of a coded file. As illustrated in FIG. 6, the coded file F2 has a header portion, coded data, and a trailer portion. The coded data stores therein groups of the word codes provided by coding for the individual files. The trailer portion stores therein the addresses of the individual files, information about the dynamic dictionary (common/individual), the hashed indexes (two-dimensional/three-dimensional), and the like. The addresses of the individual files indicate addresses of storage destinations of the individual pieces of coded data provided by coding the files. The addresses of the individual files are, as an example, addresses relative to the head of the coded data. The information about the individual dynamic dictionary D0 corresponds to information about the dynamic dictionary illustrated in FIG. 4 for each of the files. The information about the common dynamic dictionary D0 corresponds to information about the dynamic dictionary D0 illustrated in FIG. 4 for overall the files. The two-dimensional hashed index indicates the two-dimensional hashed index HI1. The three-dimensional hashed index indicates the three-dimensional hashed index HI2. The header portion stores therein pointers to the addresses of the individual files, pointers to the dictionary D0, and pointers to the hashed indexes (two-dimensional/three-dimensional) that are stored in the trailer portion. When the index generation device codes the individual files, it stores the pieces of coded data indicating individual results provided by coding in the coded file F2 and stores the storage addresses thereof as the addresses of the respective files. In decoding the coded data, the address of a file as a decoding target (the coded data) is referred to from the addresses of the respective files in the trailer portion using the pointers to the addresses of the respective files in the header portion. The decoding processing is performed by referring to the dynamic dictionary D0 using the pointer to the dynamic dictionary D0 in the header portion.

Example of Retrieval Processing in Embodiment

Figure 7:
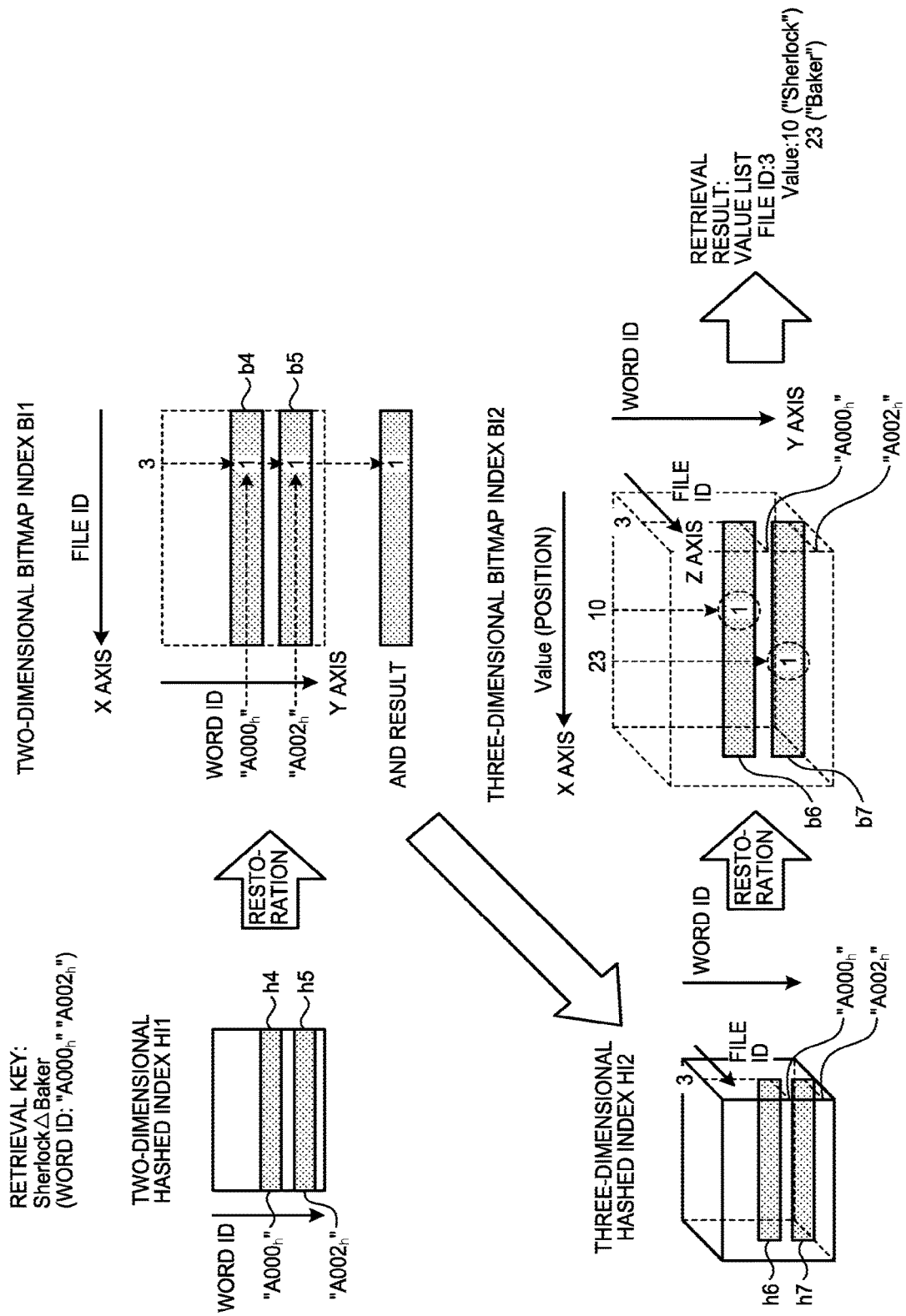
FIG. 7 is a diagram illustrating an example of retrieval processing in the embodiment.

FIG. 7 is a diagram illustrating an example of retrieval processing in the embodiment. As illustrated in FIG. 7, a retrieval device that executes the retrieval processing acquires, based on a word forming an input retrieval key, a file ID containing the word by referring to the two-dimensional hashed index HI1. Then, the retrieval device specifies a word ID indicated by the word and the file ID to the three-dimensional hashed index HI2 to identify positional information of the word.

An example of the retrieval processing is described below. For example, when the retrieval device that executes the retrieval processing receives input of a word forming a retrieval key, it extracts a hashed bitmap corresponding to the word ID indicated by the received word by referring to the two-dimensional hashed index HI1. It is assumed that "Sherlock" and "Baker" are received as the words. Then, the retrieval device extracts a hashed bitmap h4 corresponding to a word ID "A000$_h$" indicating "Sherlock" received as the retrieval word from the two-dimensional hashed index HI1. The hashed bitmap h4 includes a hashed bitmap h41 based on the base 29 and a hashed bitmap h42 based on the base 31. The retrieval device extracts a hashed bitmap h5 corresponding to the word ID "A0002$_h$" indicating "Baker" received as a retrieval word from the hashed index HI1. The hashed bitmap h5 includes a hashed bitmap h51 based on the base 29 and a hashed bitmap h52 based on the base 31.

The retrieval device restores the extracted hashed bitmap corresponding to each word ID. Note that processing of restoring the hashed bitmap will be described later. A restoration result is provided as the bitmap corresponding to the word ID. The retrieval device restores the hashed bitmap h4 corresponding to the word ID "A000$_h$" and outputs a bitmap b4 as the restoration result. The retrieval device restores the hashed bitmap h5 corresponding to the word ID "A002$_h$" and outputs a bitmap b5 as the restoration result.

The retrieval device performs an AND operation of the bitmap b4 corresponding to the word ID "A000$_h$," and the bitmap b5 corresponding to the word ID "A002$_h$,". The retrieval device outputs a file ID for which the bit of an AND result indicates ON ("1"). That is, the retrieval device narrows down to the file ID of a file containing "Sherlock" indicated by the word ID "A000$_h$," and "Baker" indicated by the word ID "A002$_h$,". In this example, "3" is output as the file ID.

The retrieval device narrows down to the file ID, and then, extracts a hashed bitmap corresponding to the word ID and the file ID by referring to the three-dimensional hashed index HI2. In this example, the retrieval device extracts a hashed bitmap h6 corresponding to the word ID "A000$_h$" and the file ID "3" from the three-dimensional hashed index HI2. The hashed bitmap h6 includes a hashed bitmap h61 based on the base 29 and a hashed bitmap h62 based on the base 31. Furthermore, the retrieval device extracts a hashed bitmap h7 corresponding to the word ID "A002$_h$," and the file ID "3" from the three-dimensional hashed index HI2. The hashed bitmap h7 includes a hashed bitmap h71 based on the base 29 and a hashed bitmap h72 based on the base 31.

The retrieval device restores each extracted hashed bitmap. A restoration result is provided as a bitmap corresponding to the word ID and the file ID. In this example, the retrieval device restores the hashed bitmap h6 corresponding to the word ID "A000$_h$" and the file ID "3" and outputs a bitmap b6 as the restoration result. The retrieval device restores the hashed bitmap h7 corresponding to the word ID "A002$_h$" and the file ID "3" and outputs a bitmap b7 as the restoration result.

The retrieval device specifies a Value (position) for which the bit of the bitmap output as the restoration result indicates ON ("1"). In this example, the retrieval device specifies a Value (position) "10" for which the bit of the bitmap b6 indicates "1". The retrieval device specifies a Value (position) "23" for which the bit of the bitmap b7 indicates "1".

The retrieval device adds the specified Values (position) to a Value list together with the file ID and the word ID and outputs the Value list as a retrieval result. In this example, the retrieval device adds the specified Value (position) "10" to the Value list together with the file ID "3" and "Sherlock" indicated by the word ID "A000$_h$,". The retrieval device adds the specified Value (position) "23" to the Value list together with the file ID "3" and "Baker" indicated by the word ID "A002$_h$,". Then, the retrieval device outputs the Value list as the retrieval result. The format of the retrieval result that is output is not limited thereto and it is sufficient that the format of the retrieval result is capable of representing a file and a position in and at which the retrieval key is present.

With this retrieval processing, the retrieval device can narrow down to the file and the position in and at which the word indicated by the retrieval key is present at high speed.

Example of Hashed Bitmap Restoration Processing in Embodiment

Figure 8:
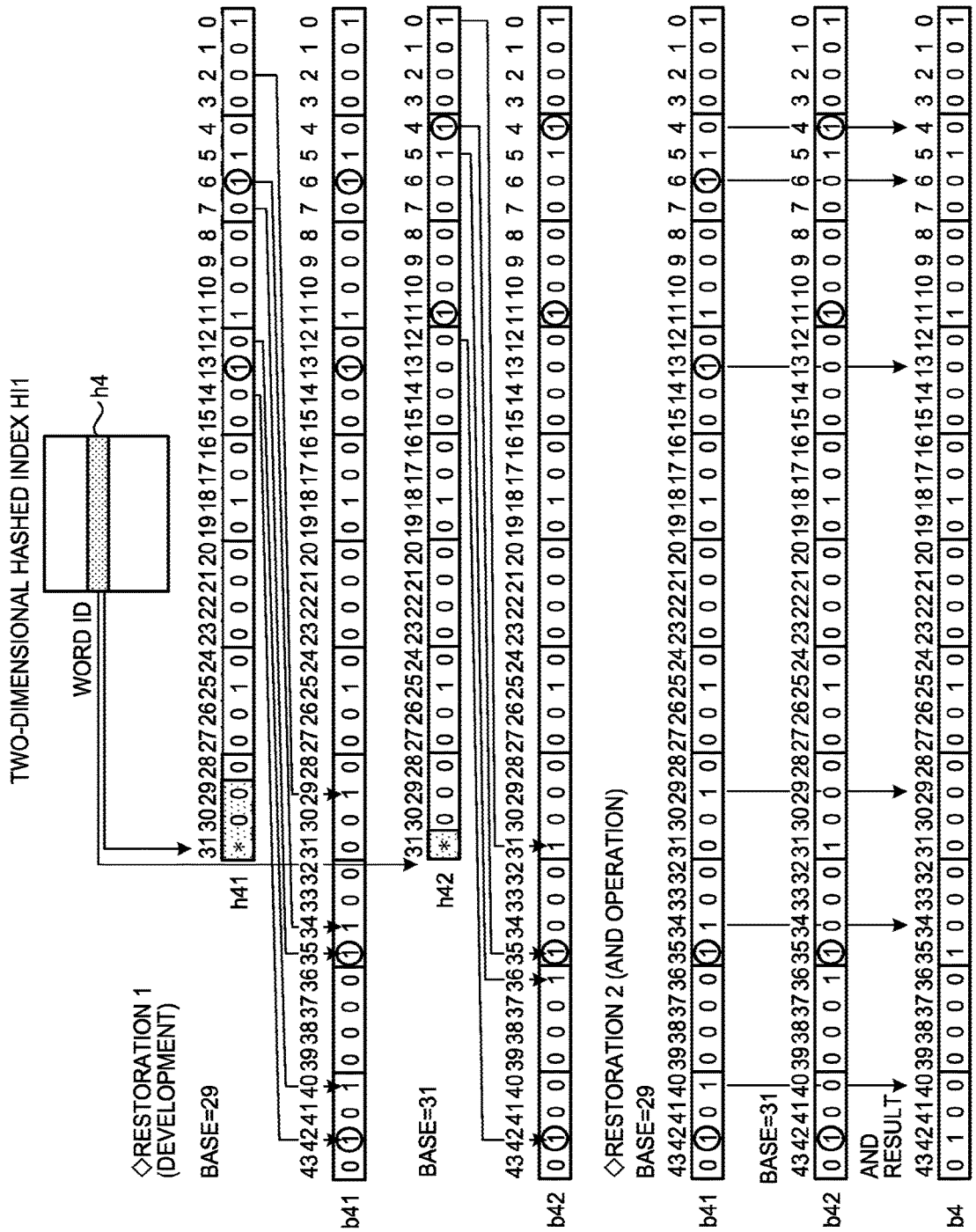
FIG. 8 is a diagram illustrating an example of hashed bitmap restoration processing in the embodiment.

Next, an example of processing of restoring the two-dimensional hashed bitmap will be described with reference to FIG. 8. FIG. 8 is a diagram illustrating an example of hashed bitmap restoration processing in the embodiment. As illustrated in FIG. 8, the hashed bitmap restoration processing restores the hashed bitmap corresponding to the word ID to a bitmap provided by developing hashing. The hashed bitmap restoration processing is executed, for example, when a file and a position in and at which the word forming the retrieval key is present are retrieved.

For example, the retrieval device develops each of the hashed bitmaps h41 and h42 of the hashed bitmap h4 illustrated in FIG. 7 into a bitmap (first restoration processing). The retrieval device sets, for a bitmap as a restoration destination of the hashed bitmap based on one base, the values of the respective bits of the hashed bitmap to positions obtained by adding the positions of the respective bits of the hashed bitmap to values calculated by multiplying the base by an integer (0 or more). As an example, the retrieval device sets, for a bitmap b41 as the restoration destination of the hashed bitmap h41 based on the base 29, the values of the respective bits of the hashed bitmap h41 to positions obtained by adding the positions of the respective bits of the hashed bitmap h41 to values calculated by multiplying the base 29 by "0". The retrieval device sets, for the bitmap b41 as the restoration destination of the hashed bitmap h41 based on the base 29, the values of the respective bits of the hashed bitmap h41 to positions obtained by adding the positions of the respective bits of the hashed bitmap h41 to values calculated by multiplying the base 29 by "1". The retrieval device repeats this setting until a value of a bit at a maximum bit position of the bitmap b41 as the restoration destination based on the base 29 is set. In the same manner, the retrieval device sets, for a bitmap b42 as the restoration destination of the hashed bitmap h42 based on the base 31, the values of the respective bits of the hashed bitmap h42 to positions obtained by adding the positions of the respective bits of the hashed bitmap h42 to values calculated by multiplying the base 31 by "0". The retrieval device sets, for the bitmap b42 as the restoration destination of the hashed bitmap h42 based on the base 31, the values of the respective bits of the hashed bitmap h42 to positions obtained by adding the positions of the respective bits of the hashed bitmap h42 to values calculated by multiplying the base 31 by "1". The retrieval device repeats this setting until a value of a bit at a maximum bit position of the bitmap b42 as the restoration destination is set.

The retrieval device performs an AND operation on the bits at corresponding positions of the individual bitmaps provided by restoration by the first restoration processing (second restoration processing). In this example, the retrieval device performs the AND operation on the bitmap b41 restored from the hashed bitmap h41 based on the base 29 and the bitmap b42 restored from the hashed bitmap h42 based on the base 31. The retrieval device outputs, as a restoration result, the bitmap b4 as an AND result.

It is sufficient that the retrieval device also restores the hashed bitmap of the three-dimensional hashed index HI2 in the same manner as for the hashed bitmaps of the two-dimensional hashed index HI1.

Configuration of Index Generation Device in Embodiment

Figure 9:
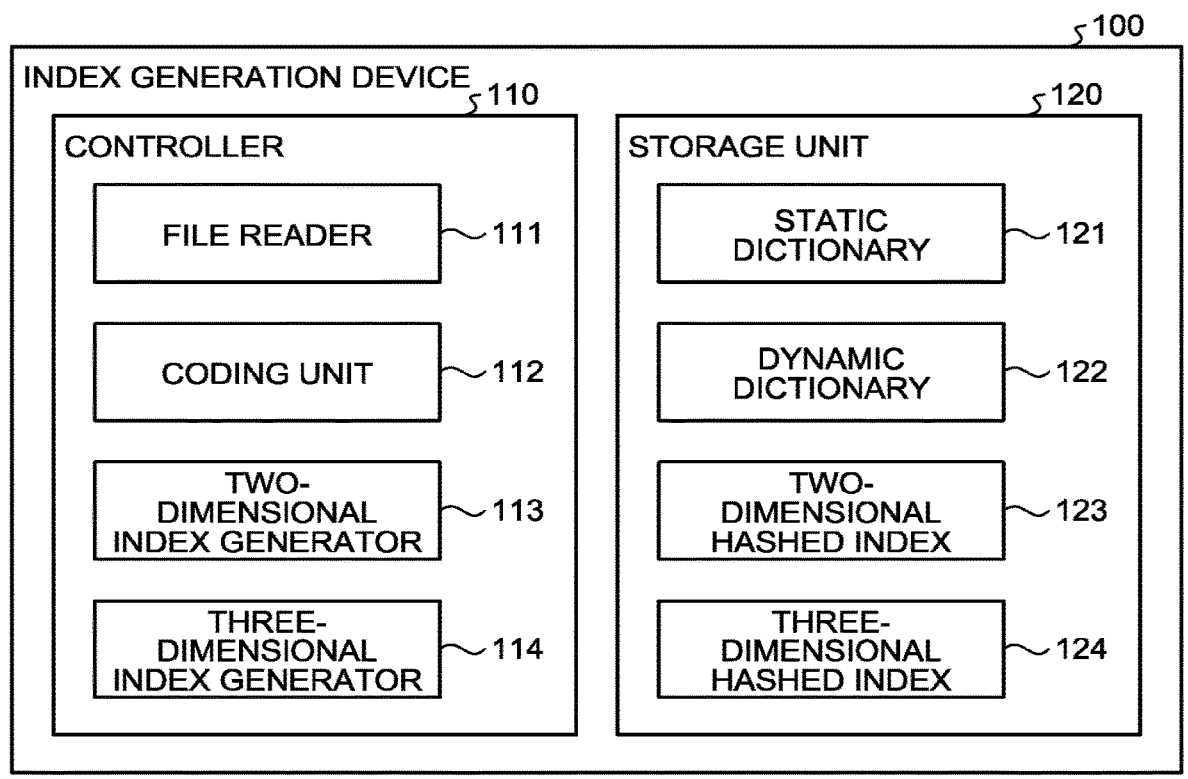
FIG. 9 is a functional block diagram illustrating the configuration of an index generation device in the embodiment.

Next, the configuration of an index generation device 100 in the embodiment will be described with reference to FIG. 9. FIG. 9 is a functional block diagram illustrating the configuration of the index generation device in the embodiment. As illustrated in FIG. 9, the index generation device 100 includes a controller 110 and a storage unit 120.

The controller 110 is a processor that executes the index generation processing illustrated in FIG. 2. The controller 110 has a program defining various processing procedures and an internal memory for storing therein control data and executes various pieces of processing with them. The controller 110 corresponds to, for example, an electronic circuit of an integrated circuit such as an application specific integrated circuit (ASIC) and a field-programmable gate array (FPGA). Alternatively, the controller 110 corresponds to an electronic circuit such as a central processing unit (CPU) and a micro-processing unit (MPU). The controller 110 includes a file reader 111, a coding unit 112, a two-dimensional index generator 113, and a three-dimensional index generator 114.

The storage unit 120 corresponds to, for example, a storage device such as a non-volatile semiconductor memory element like a flash memory and a ferroelectric random access memory (FRAM) (registered trademark). The storage unit 120 includes a static dictionary 121, a dynamic dictionary 122, a two-dimensional hashed index 123, and a three-dimensional hashed index 124. The two-dimensional hashed index 123 is hashed for a two-dimensional bitmap index. The three-dimensional hashed index 124 is hashed for a three-dimensional bitmap index. The respective structures of the two-dimensional bitmap index and the three-dimensional bitmap index are the same as those in FIG. 2 and FIG. 3 and description thereof is therefore omitted. The structure of the two-dimensional hashed index 123 is the same as the structure provided by gathering the hashed bitmaps (see FIG. 5) corresponding to the words ID and description thereof is therefore omitted. The structure of the three-dimensional hashed index 124 is the same as the structure provided by gathering the hashed bitmaps (see FIG. 5) corresponding to the word IDs and the file IDs and description thereof is therefore omitted.

The static dictionary 121 is a dictionary provided by specifying appearance frequencies of words appearing in documents based on general English dictionaries, Japanese language dictionaries, textbooks, and the like, and assigning shorter codes to the words with higher appearance frequencies. Note that the static dictionary 121 corresponds to the static dictionary S0 in FIG. 2.

The dynamic dictionary 122 is a dictionary in which words that are not registered in the static dictionary 121 and dynamically assigned dynamic codes (codes) correspond to each other. Note that the dynamic dictionary 122 corresponds to the dynamic dictionary D0 in FIG. 4. The description of the dynamic dictionary 122 the same as the description in FIG. 4 and is therefore omitted.

The file reader 111 reads out a plurality of files in the file F1 as the coding target into the storage region. The file reader 111 reads out a target file from the storage region and performs the lexical analysis on the read target files. The file reader 111 outputs, to the coding unit 112, individual words as results of the lexical analysis in order.

The coding unit 112 codes the words based on the static dictionary 121 and the dynamic dictionary 122. For example, the coding unit 112 determines whether character strings of the words output from the file reader 111 have been registered in the static dictionary 121. The coding unit 112 determines whether the character strings of the target words hit the bit filter of the static dictionary 121, as an example. When the character strings of the target words have been registered in the static dictionary 121, the coding unit 112 codes the character strings of the words based on the static dictionary 121. As an example, the coding unit 112 codes the character strings of the words into static codes (word codes) that correspond to the character strings of the words based on the static dictionary 121. The coding unit 112 outputs the word codes provided by coding to the two-dimensional index generator 113.

When the character strings of the target words have not been registered in the static dictionary 121, the coding unit 112 codes the character strings of the words based on the dynamic dictionary 122. The coding unit 112 determines whether the character strings of the words have been stored in the buffer portion D1 of the dynamic dictionary 122, as an example. When the character strings of the words have not been stored in the buffer portion D1 of the dynamic dictionary 122, the coding unit 112 stores the character strings of the words in the buffer portion D1 and stores storage positions at which the character strings of the words are stored and stored data lengths in the address table D2. The coding unit 112 codes the character strings of the words into dynamic codes (word codes) in the address table D2, corresponding to the character strings of the words. When the character strings of the words have been stored in the buffer portion D1 of the dynamic dictionary 122, the coding unit 112 codes the character strings of the words into dynamic codes (word codes), corresponding to the character strings of the words. The coding unit 112 outputs pieces of information containing the word codes provided by coding and the positions of the words indicated by the word codes to the two-dimensional index generator 113 and the three-dimensional index generator 114.

The two-dimensional index generator 113 generates the two-dimensional hashed index 123 based on the file ID of the target file and the word codes provided by coding. For example, the two-dimensional index generator 113 receives the pieces of information output from the coding unit 112. The two-dimensional index generator 113 hashes bits of the bitmaps corresponding to the word codes for the file ID of the target file using a base $\alpha$ and a base $\beta$ based on the pieces of received information and sets "1" to the bits. That is, the two-dimensional index generator 113 sets presence or absence of the words indicated by the word codes for the target file to the two-dimensional hashed index 123.

As an example, the two-dimensional index generator 113 generates hashed bitmaps based on the two hash values (bases) for the respective bitmaps corresponding to the word IDs (word codes). That is, the two-dimensional index generator 113 sets the individual bits from 0th bits of the bitmaps in order from 0th bits to (base-1)th bits of the hashed bitmaps. Then, the two-dimensional index generator 113 returns to the 0th bits of the hashed bitmaps again and sets values calculated by an OR operation with the values that have been already set to the hashed bitmaps thereto. When the two-dimensional index generator 113 generates the hashed bitmaps for the bitmaps corresponding to all of the word IDs, it stores the two-dimensional hashed index 123 provided by gathering the generated hashed bitmaps in the storage unit 120.

The three-dimensional index generator 114 generates the three-dimensional hashed index 124 based on the file ID of the target file, the word codes provided by coding, and the positions of the words indicated by the word codes. For example, the three-dimensional index generator 114 receives the pieces of information output from the coding unit 112. The three-dimensional index generator 114 hashes bits of the bitmaps corresponding to the word codes and the file ID of the target file for the positions of the words indicated by the word codes using the base α and the base β based on the pieces of received information and sets "1" to the bits. That is, the three-dimensional index generator 114 sets the word codes and the positions of the words indicated by the word codes for the target file to the three-dimensional hashed index 124.

The hashed bitmap generation method is the same as that described for the two-dimensional index generator 113 and description thereof is therefore omitted.

Processing Procedures of Index Generation Processing in Embodiment

Figure 10:
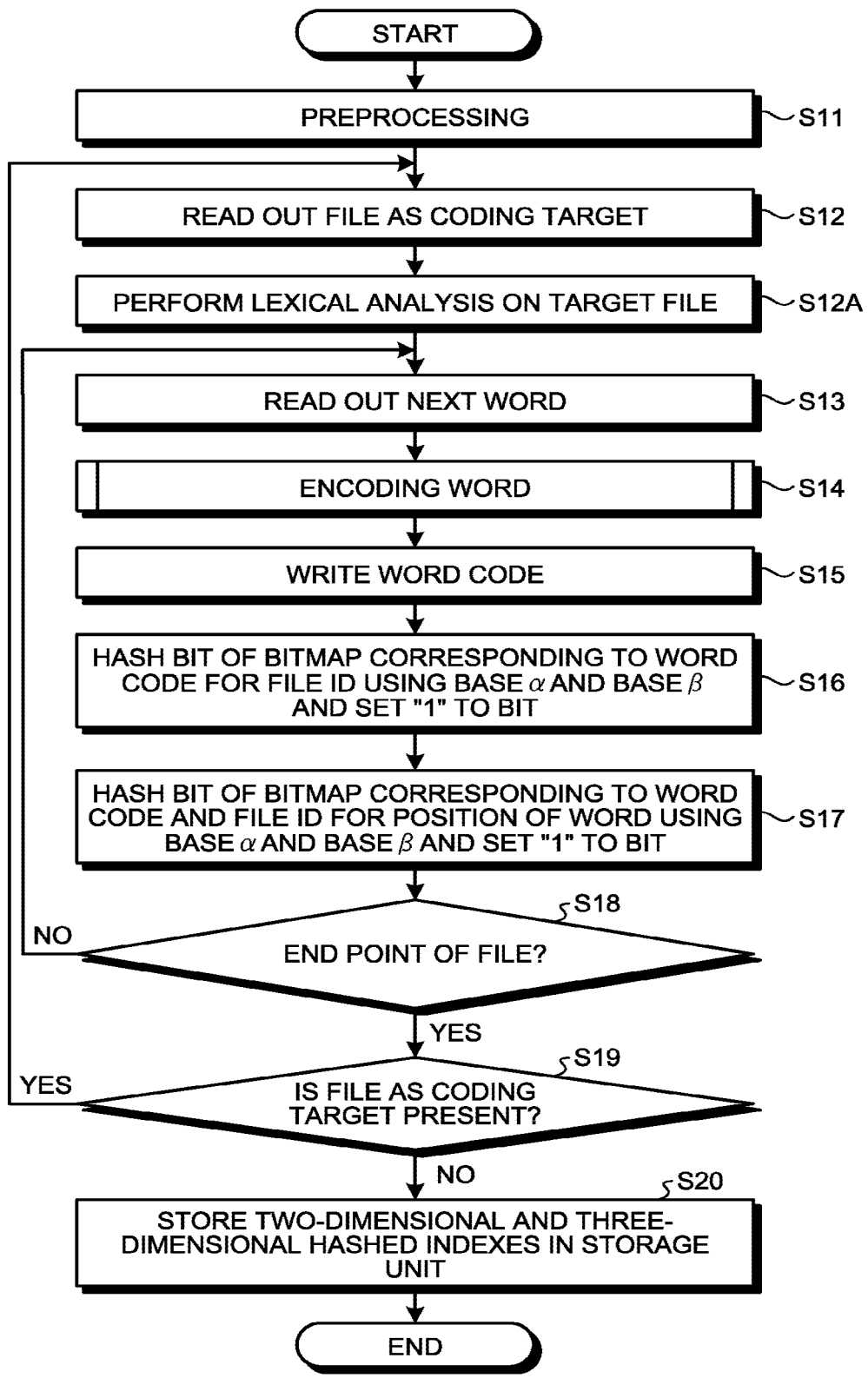
FIG. 10 is a diagram illustrating an example of a flowchart of index generation processing in the embodiment.

Next, processing procedures of the index generation processing in the embodiment will be described with reference to FIG. 10. FIG. 10 is a diagram illustrating an example of a flowchart of the index generation processing in the embodiment.

As illustrated in FIG. 10, the index generation device 110 executes preprocessing (step S11). The index generation device 110, for example, ensures various storage regions in the storage unit 120.

The index generation device 110 reads out one target file among the target files in the file F1 as the coding target, and stores the read target file in a storage region for reading (step S12). The index generation device 110 performs the lexical analysis on the target file (step S12A).

The index generation device 110 reads out character strings of words as results of the lexical analysis from the head (step S13). The index generation device 110 codes the read word (step S14). Note that coding processing on the word will be described later. Then, the index generation device 110 writes a word code output by the coding processing on the word into a storage region for coded data corresponding to the target file (step S15).

Subsequently, the index generation device 110 hashes a bit of a bitmap corresponding to the word code for a file ID indicating the target file using the base α and the base β and sets "1" to the bit (step S16). For example, the index generation device 110 sets, for a hashed bitmap based on the base α, values of individual bits of the bitmap to positions matching with remainders calculated by dividing the positions of the individual bits of the bitmap by the base α. The index generation device 110 sets, for a hashed bitmap based on the base β, the values of the individual bits of the bitmap to positions matching with remainders calculated by dividing the positions of the individual bits of the bitmap by the base β. That is, the index generation device 110 sets the individual bits from a 0th bit of the bitmap in order from 0th bits to (base-1)th bits of the hashed bitmaps, and returns to the 0th bits of the hashed bitmaps again and sets results provided by the OR operation thereto. In other words, the index generation device 110 sets presence or absence of the word indicated by the word code for the target file to the two-dimensional bitmap index 123.

Subsequently, the index generation device 110 hashes a bit of the bitmap corresponding to the word code and the file ID for the position of the word indicated by the word code using the base α and the base β and sets "1" to the bit (step S17). That is, the index generation device 110 sets the word code and the position of the word indicated by the word code for the target file to the three-dimensional hashed index 124.

The index generation device 110 determines whether the processing reaches a termination point of the target file (step S18). When it is determined that the processing does not reach the termination point of the target file (No at step S18), the index generation device 110 shifts to step S13 to read out a next word of the target file.

On the other hand, when it is determined that the processing reaches the termination point of the target file (Yes at step S18), the index generation device 110 determines whether a target file that has not been coded is present (step S19). When the target file that has not been coded is determined to be present (Yes at step S19), the index generation device 110 shifts to step S12 to code a next target file.

When no target file that has not been coded is determined to be present (No at step S19), the index generation device 110 stores the two-dimensional hashed index 123 provided by gathering the generated hashed bitmaps in the storage unit 120. The index generation device 110 stores the three-dimensional hashed index 124 provided by gathering the generated hashed bitmaps in the storage unit 120 (step S20). Then, the index generation device 110 finishes the index generation processing.

Processing Procedures of Coding Processing

Figure 11:
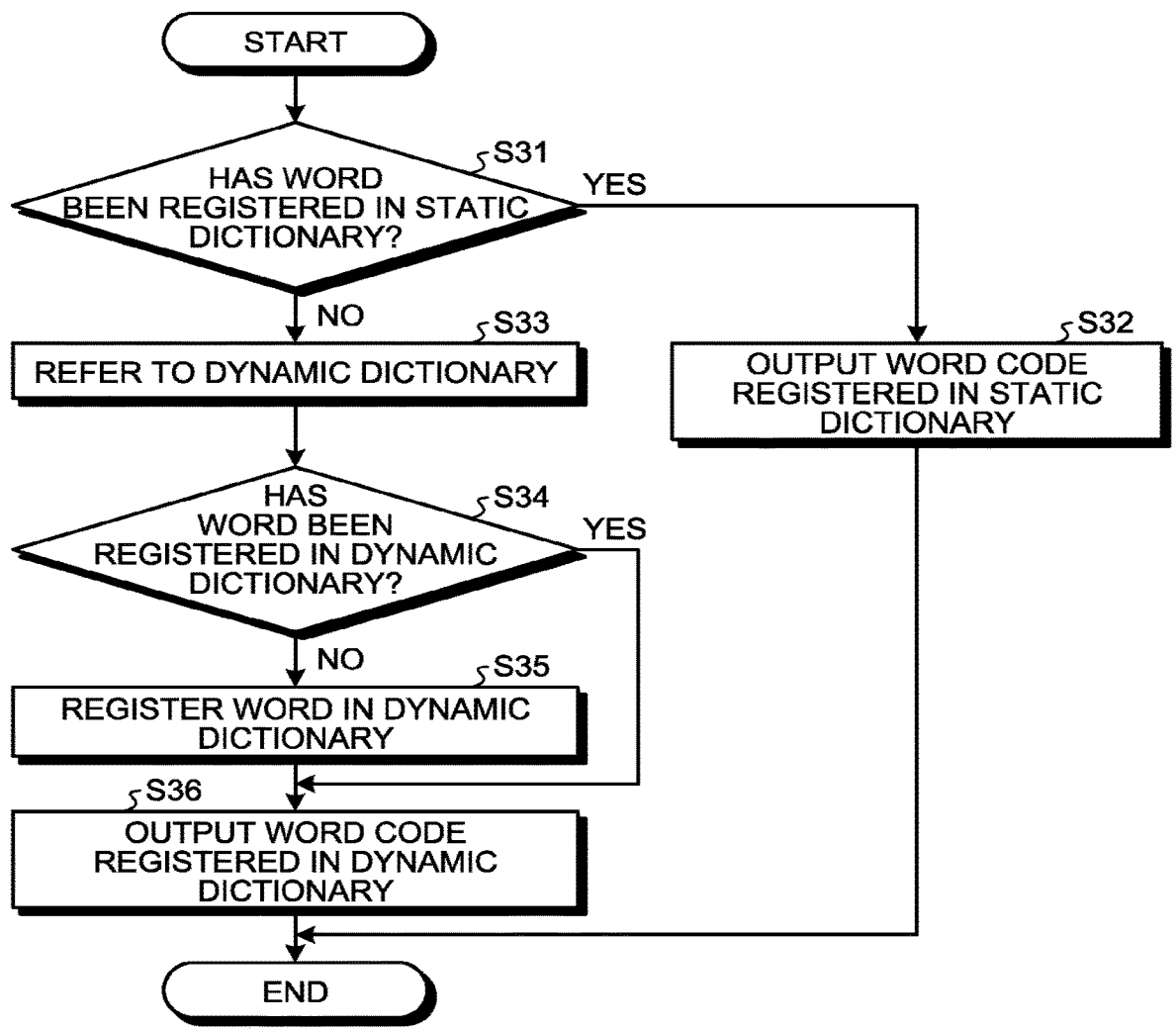
FIG. 11 is a diagram illustrating an example of a flowchart of coding processing in the embodiment.

Next, processing procedures of the coding processing in the embodiment will be described with reference to FIG. 11. FIG. 11 is a diagram illustrating an example of a flowchart of the coding processing in the embodiment. It is assumed that the index generation device 110 has received the character string of the word.

As illustrated in FIG. 11, the index generation device 110 that has received the character string of the word determines whether the character string of the word has been registered in the static dictionary 121 (step S31). When it is determined that the character string of the word has been registered in the static dictionary 121 (Yes at step S31), the index generation device 110 outputs the static code (word code) registered in the static dictionary 121 (step S32). Then, the index generation device 110 finishes the coding processing.

On the other hand, when it is determined that the character string of the word has not been registered in the static dictionary 121 (No at step S31), the index generation device 110 refers to the dynamic dictionary 122 (step S33). The index generation device 110 determines whether the character string of the word has been registered in the dynamic dictionary 122 (step S34). The index generation device 110 determines whether the character string of the word has been registered in, for example, the buffer portion D1 of the dynamic dictionary 122.

When it is determined that the character string of the word has been registered in the dynamic dictionary 122 (Yes at step S34), the index generation device 110 shifts to step S36.

On the other hand, when it is determined that the character string of the word has not been registered in the dynamic dictionary 122 (No at step S34), the index generation device 110 registers the character string of the word in the dynamic dictionary 122 (step S35). The index generation device 110 stores the character string of the word in, for example, the buffer portion D1 of the dynamic dictionary 122 and stores the storage position at which the character string of the word is stored and the stored data length in the address table D2. Then, the index generation device 110 shifts to step S36.

At step S36, the index generation device 110 outputs the word code (dynamic code) registered in the dynamic dictionary 122 (step S36). The index generation device 110 codes the character string of the word into, for example, a dynamic code in the address table D2 that corresponds to the character string of the word. The index generation device 110 outputs the dynamic code provided by coding as the word code. Then, the index generation device 110 finishes the coding processing.

Configuration of Retrieval Device in Embodiment

Figure 12:
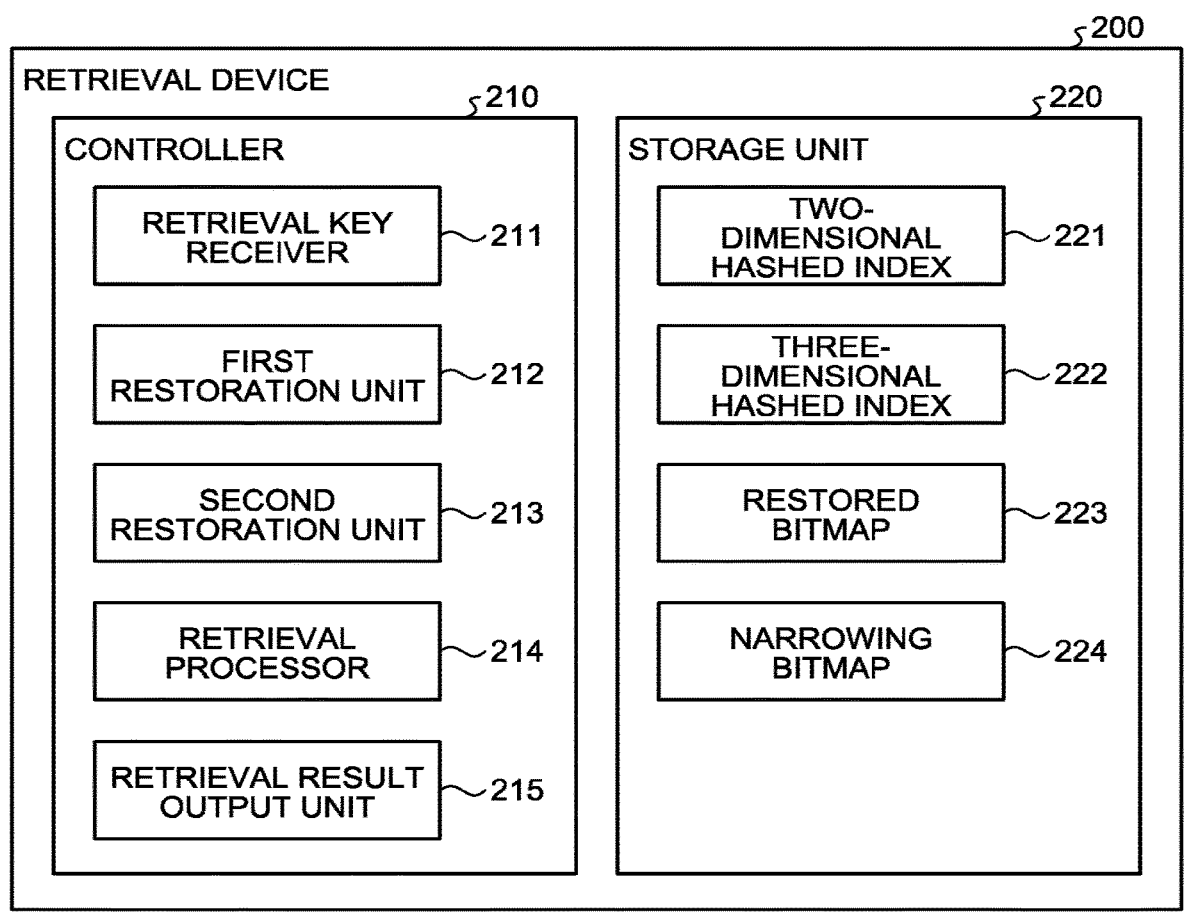
FIG. 12 is a functional block diagram illustrating the configuration of a retrieval device in the embodiment.

Next, the configuration of a retrieval device 200 that executes the retrieval processing in the embodiment will be described with reference to FIG. 12. FIG. 12 is a functional block diagram illustrating the configuration of the retrieval device in the embodiment. As illustrated in FIG. 12, the retrieval device 200 includes a controller 210 and a storage unit 220.

The controller 210 is a processor that executes the retrieval processing illustrated in FIG. 7. The controller 210 has a program defining various processing procedures and an internal memory for storing therein control data and executes various pieces of processing with them. The controller 210 corresponds to, for example, an electronic circuit of an integrated circuit such as an ASIC and an FPGA. Alternatively, the controller 210 corresponds to an electronic circuit such as a CPU and an MPU. The controller 210 includes a retrieval key receiver 211, a first restoration unit 212, a second restoration unit 213, a retrieval processor 214, and a retrieval result output unit 215.

The storage unit 220 corresponds to, for example, a storage device such as a non-volatile semiconductor memory element like a flash memory and a FRAM (registered trademark). The storage unit 220 includes a two-dimensional hashed index 221, a three-dimensional hashed index 222, a restored bitmap 223, and a narrowing bitmap 224. The structure of the two-dimensional hashed index 221 is the same as the structure provided by gathering the hashed bitmaps (see FIG. 5) corresponding to the word IDs and description thereof is therefore omitted. The structure of the three-dimensional hashed index 222 is the same as the structure provided by gathering the hashed bitmaps (see FIG. 5) corresponding to the word IDs and the file IDs and description thereof is therefore omitted. The structure of the restored bitmap 223 is the same as the structure of the bitmap (see FIG. 8) and description thereof is therefore omitted. The structure of the narrowing bitmap 224 is the same as the structure of the bitmap (see FIG. 8) that corresponds to the AND result for each word and description thereof is therefore omitted.

The retrieval key receiver 211 receives a retrieval key. The retrieval key receiver 211 receives, for example, a word as a retrieval target as the retrieval key. The word as the retrieval target may be a signal word or a plurality of words.

The first restoration unit 212 restores hashed bitmaps corresponding to the word ID indicated by the word as the retrieval target. For example, the first restoration unit 212 extracts the hashed bitmaps corresponding to the word ID of the word received by the retrieval key receiver 211 by referring to the two-dimensional hashed index HI1. The first restoration unit 212 develops the respective extracted hashed bitmaps to bitmaps (first restoration processing). Then, the first restoration unit 212 performs an AND operation of the bits at corresponding positions in the individual bitmaps developed by the first restoration processing (second restoration processing). The restoration unit 212 holds a bitmap provided as an AND result as a restoration result in the restored bitmap 223. When there are a plurality of words as the retrieval targets, the first restoration unit 212 restores the hashed bitmaps for the individual words as the retrieval targets and holds bitmaps as restoration results in the restored bitmap 223.

The first restoration unit 212 outputs a file ID of a file containing the word as the retrieval target to the second restoration unit 213. For example, when the restored bitmap 223 holds a plurality of bitmaps, the first restoration unit 212 performs an AND operation on the bitmaps and holds an AND result in the narrowing bitmap 224. When the restored bitmap 223 holds a single bitmap, the first restoration unit 212 copies the bitmap into the narrowing bitmap 224. Then, the first restoration unit 212 outputs the file ID for which the bit of the narrowing bitmap 224 indicates "1" to the second restoration unit 213.

The second restoration unit 213 restores the hashed bitmaps corresponding to the file ID and the word ID indicated by the word as the retrieval target. For example, the second restoration unit 213 extracts the hashed bitmaps corresponding to the file ID output from the first restoration unit 212 and the word ID of the word as the retrieval target by referring to the three-dimensional hashed index HI2. The second restoration unit 213 develops the extracted hashed bitmaps into respective bitmaps (first restoration processing). Then, the second restoration unit 213 performs an AND operation on the bits at corresponding positions in the respective bitmaps developed by the first restoration processing (second restoration processing). The second restoration unit 213 holds a bitmap as an AND result as the restoration result in the restored bitmap 223.

The retrieval processor 214 retrieves the position of the word in the file containing the word as the retrieval target. For example, the retrieval processor 214 extracts a Value (position) for which the bit of the bitmap held in the restored bitmap 223 by the second restoration unit 213 indicates "1". The extracted Value (position) is a position of the word in the file containing the word as the retrieval target.

The retrieval result output unit 215 adds the Value (position) retrieved by the retrieval processor 214 to a Value list together with the file ID and the word indicated by the word ID. Then, the retrieval result output unit 215 outputs the Value list as a retrieval result.

Flowchart of Retrieval Processing

Figure 13:
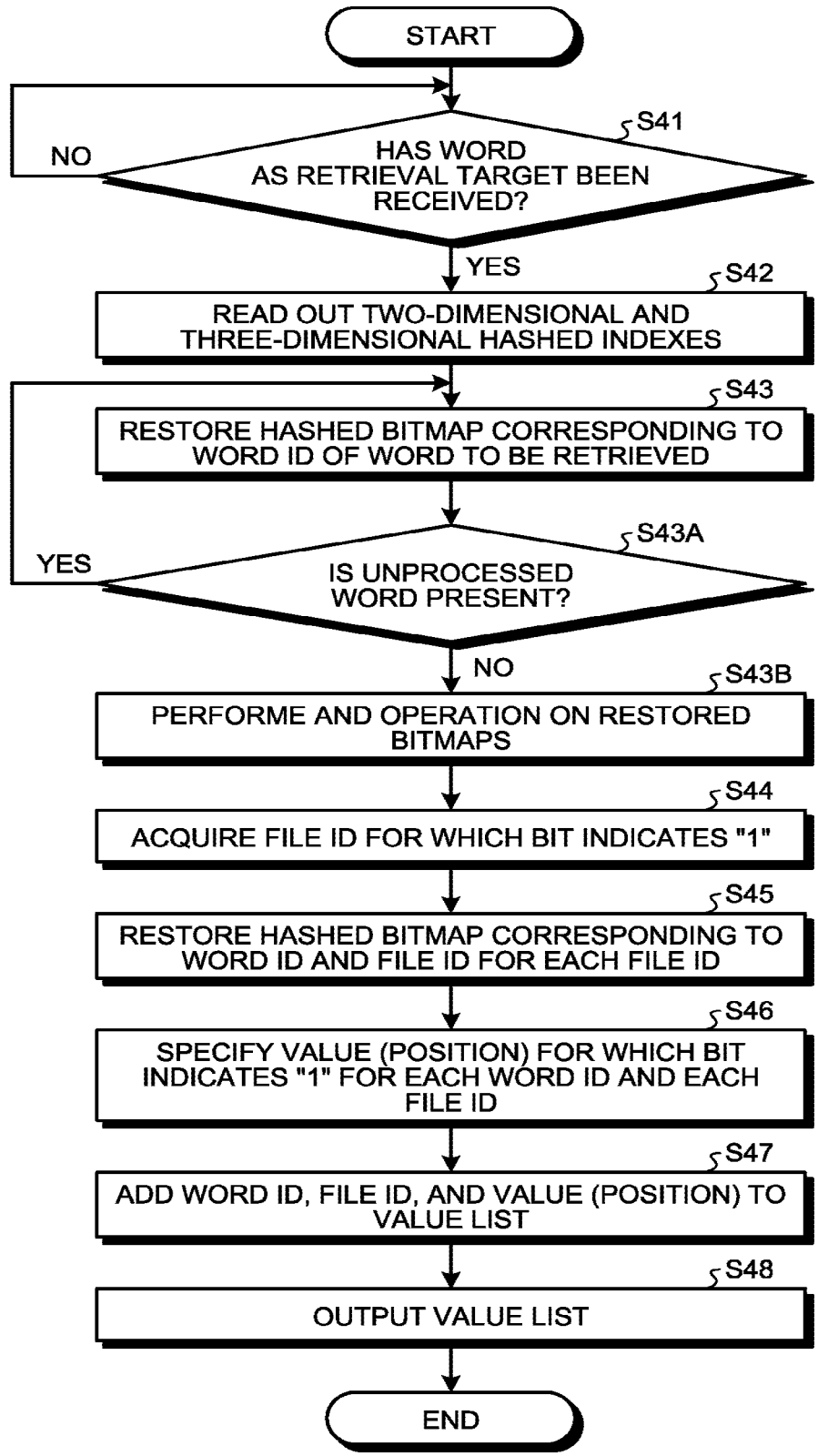
FIG. 13 is a diagram illustrating an example of a flowchart of retrieval processing in the embodiment.

FIG. 13 is a diagram illustrating an example of a flowchart of the retrieval processing in the embodiment.

As illustrated in FIG. 13, the retrieval device 200 determines whether the word as the retrieval target has been received (step S41). When it is determined that the word as the retrieval target has not been received (No at step S41), the retrieval device 200 repeats the determination processing until the word as the retrieval target has been received.

On the other hand, when it is determined that the word as the retrieval target has been received (Yes at step S41), the retrieval device 200 reads out the two-dimensional hashed index 221 and the three-dimensional hashed index 222 from the storage unit 220 (step S42).

The retrieval device 200 selects a hashed bitmap corresponding to the word ID indicated by the word as the retrieval target by referring to the read two-dimensional hashed index 221 and restores the selected hashed bitmap (step S43). The retrieval device 200 determines whether an unprocessed word is present (step S43A). When it is determined that the unprocessed word is present (Yes at step S43A), the retrieval device 200 shifts to step S43 to process a next word as the retrieval target.

On the other hand, when it is determined that no unprocessed word is present (No at step S43A) and there are a plurality of restored bitmaps, the retrieval device 200 performs an AND operation on the restored bitmaps and holds an AND result in the narrowing bitmap 224 (step S43B). Then, the retrieval device 200 acquires a file ID for which the bit of the narrowing bitmap 224 indicates "1" (step S44).

The retrieval device 200 selects a hashed bitmap corresponding to the word ID and the file ID for each acquired file ID by referring to the three-dimensional hashed index 222 and restores the selected hashed bitmap (step S45). Then, the retrieval device 200 acquires a Value (position) for which the bit indicates "1" for each word ID and each file ID (step S46).

The retrieval device 200 adds the word ID, the file ID, and the Value (position) to the Value list (step S47). Then, the retrieval device 200 outputs the Value list (step S48) and finishes the retrieval processing.

With the retrieval processing, the retrieval device 200 can specify the position of the word in the file containing the word by the two-dimensional hashed index 221 and the three-dimensional hashed index 222.

Effects of Embodiment

According to the above-mentioned embodiment, the index generation device 100 generates the pieces of information about the presence or absence of the individual keys and the positions at which the keys are present when the individual keys are present for the individual input files in the lexical analysis on the respective files. Then, the index generation device 100 generates the index information of the keys and the positions for the respective files based on the pieces of generated information. With this configuration, the index generation device 100 generates the index information containing the keys and the positions by performing the lexical analysis on the input files, thereby generating the index information in the compression format with one pass. That is, the index generation device 100 can easily generate the index information that corresponds to the files, the keys, and the positions thereof.

Other Modes Related to Embodiment

Hereinafter, some modifications of the above-mentioned embodiment will be described. In addition to the following modifications, changes in design in a range without departing from the gist of the present invention can be appropriately made.

The index generation device 100 in the embodiment hashes the individual bitmaps based on the hash values (bases) of 29 and 31 while the 32-bit register is supposed. In the embodiment, one bitmap has 44 bits. The hash values (bases) of 29 and 31 are, however, an example and the hash values are not limited thereto. The number of bits of each bitmap is also an example and is not limited to 44 bits. It is sufficient that the two hash values (bases) are determined in accordance with the number of types of words in each of a plurality of files. When the number of types of words is assumed to be, for example, 10,000, the two bases are selected such that the number of two-dimensional matrices expressed by remainders calculated by division by one base and remainders calculated by division by the other base is approximately 10,000. It is sufficient that the two bases are adjacent primes. When the number of matrices is 10,000, the selected two primes are, as an example, 97 and 101. That is, the bases are determined based on the estimation that in a two-dimensional matrix space having a least common multiple of approximately 10,000, a combination of remainders calculated using one hash and the other hash for a certain word does not collide (overlap) with a combination of remainders calculated for other words.

In the embodiment, the index generation device 100 generates the hashed bitmaps based on the two hash values (bases) for each of the bitmap corresponding to the word ID and the bitmap corresponding to the word ID and the file ID. The index generation device 100 detects hash collision (hash noise) in some cases when the hashed bitmaps are generated. The bit values at a plurality of positions are set to "1" in the bitmaps corresponding to, for example, the words with super-high frequency because the words with super-high frequency are present in a plurality of files. When the bitmaps are hashed, "1" is set at the same positions of the hashed bitmaps in an overlapped manner in some cases. Examples of the words with super-high frequency include "the" and "on". It is sufficient that the index generation device 100 performs hash collision monitoring against the hash noise and reduces the hash noise by measurement of a 0/1 ratio or division of the bitmaps. When collision consecutively occurs in any one of the hashed bitmaps, the index generation device 100 tallies the ratio between the presence and absence (I/O) using presence or absence information of the bitmap corresponding to the hashed bitmap that has caused the collision. The index generation device 100 divides the bitmap corresponding to the hashed bitmap that has caused the collision when the ratio of "1" is higher than a threshold. As an example, the index generation device 100 extracts bits at even-numbered positions of the bitmap corresponding to the hashed bitmap that has caused the collision and generates a bitmap newly. In addition, the index generation device 100 extracts bits at odd-numbered positions of the bitmap corresponding to the hashed bitmap that has caused the collision and generates a bitmap newly. Then, the index generation device 100 stores the divided new bitmaps in, for example, a region of the words with low frequencies as a division destination. The index generation device 100 sets the division destination for any one of the two hashed bitmaps. The index generation device 100 generates individual hashed bitmaps based on the two hash values (bases) for the individual bitmaps at the division destination after the division of the bitmap. With this configuration, the index generation device 100 divides and hashes the even-numbered pieces of data and the odd-numbered pieces of data of the bitmap before the hashing even when the pieces of data of the hashed bitmap collide with each other, thereby avoiding collision of the pieces of data.

When the retrieval device 200 receives the word as the retrieval target, the position of the word in the file containing the word is retrieved. That is, the retrieval device 200 restores the hashed bitmaps corresponding to the word ID indicated by the word received as the retrieval target using the two-dimensional hashed index 221 and acquires the file ID for which the bit indicates "1". The retrieval device 200 restores the hashed bitmaps corresponding to the word ID and the acquired file ID using the three-dimensional hashed index 222 and specifies the Value (position) for which the bit indicates "1" to retrieve the position of the word as the retrieval target. The retrieval device 200 is not however limited thereto, and the retrieval device 200 may retrieve a file corresponding to the word as the retrieval target and the position of the word when it receives the word and the position of the word. That is, the retrieval device 200 restores the hashed bitmaps corresponding to the word ID indicated by the word received as the retrieval target and the position of the word using the three-dimensional hashed index 222 and specifies the file ID for which the bit indicates "1". With this configuration, the retrieval device 200 can specify the file matching with a retrieval condition having both of the word and the position of the word only by the three-dimensional hashed index 222.

The index generation device 100 in the embodiment generates the hashed indexes provided by applying hashing two-dimensionally (to the axis of the word and the axis of the file) and three-dimensionally (to the axis of the word, the axis of the file, and the axis of the position) based on the adjacent hash values (bases). The index generation device 100 may however employ an axis of a block instead of the axis of the file. That is, presence or absence information of the word ID may be based on a block.

Furthermore, pieces of information containing the processing procedures, control procedures, specific names, various pieces of data, and parameters described in the embodiment can be desirably changed unless otherwise specified.

Hardware Configuration

Figure 14:
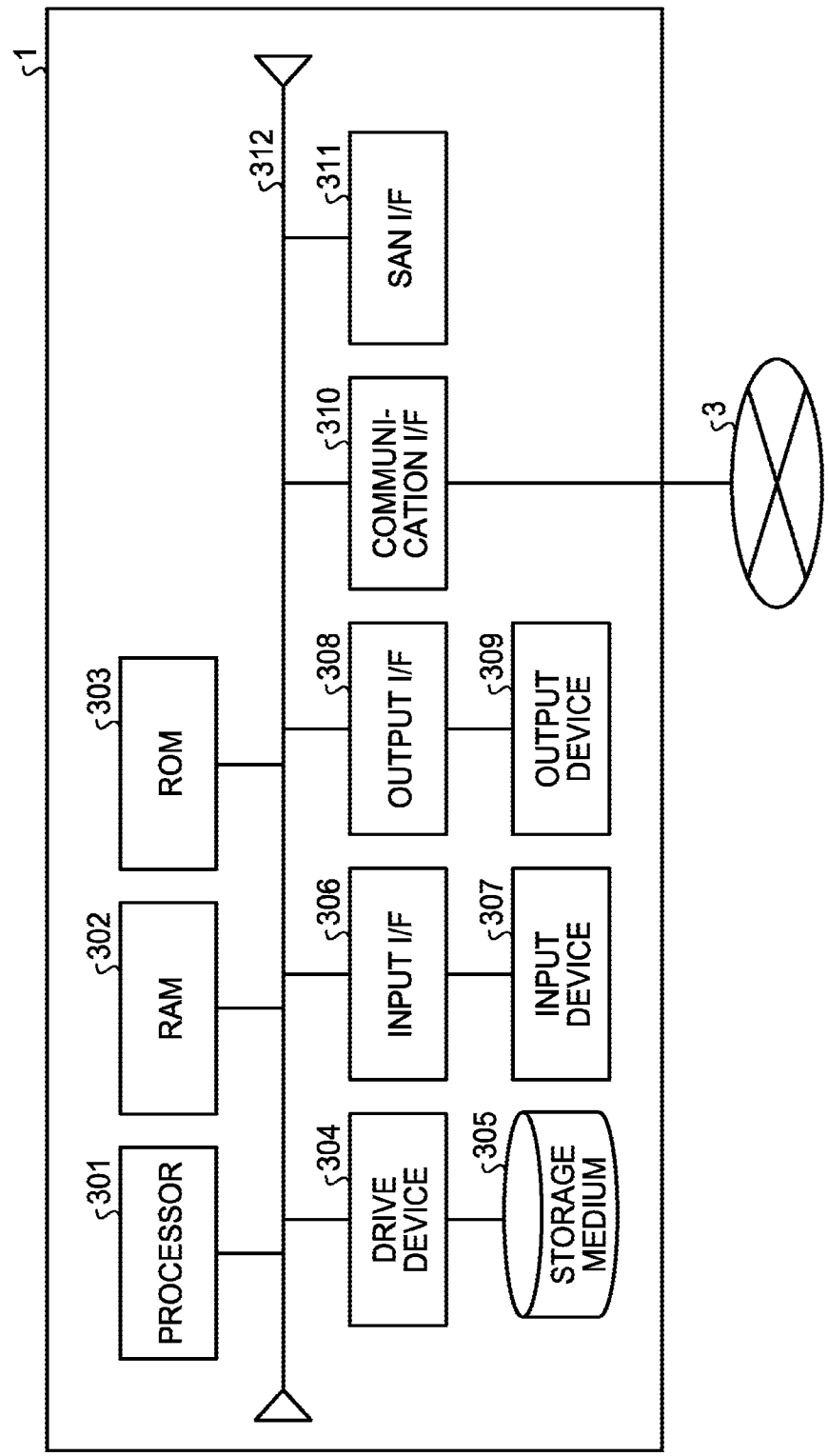
FIG. 14 is a diagram illustrating an example of the hardware configuration of a computer.

The following describes hardware and software that are used for the above-mentioned embodiment. FIG. 14 is a diagram illustrating an example of the hardware configuration of a computer 1. The computer 1 includes a processor 301, a random access memory (RAM) 302, a read only memory (ROM) 303, a drive device 304, a storage medium 305, an input interface (I/F) 306, an input device 307, an output interface (I/F) 308, an output device 309, a communication interface (I/F) 310, a storage area network (SAN) interface (I/F) 311, and a bus 312. The individual pieces of hardware are connected to one another via the bus 312.

The RAM 302 is a readable and writable memory device, and is implemented by, for example, a semiconductor memory such as a static RAM (SRAM) and a dynamic RAM (DRAM), or a flash memory other than the RAM. The ROM 303 also includes a programmable ROM (PROM). The drive device 304 is a device that performs at least any of reading and writing of information recorded in the storage medium 305. The storage medium 305 stores therein the information written by the drive device 304. The storage medium 305 is, for example, a storage medium such as a hard disk, a flash memory like a solid state drive (SSD), a compact disc (CD), a digital versatile disc (DVD), and a Blu-ray (registered trademark) disc. The computer 1 includes, for example, the drive device 304 and the storage medium 305 for each of a plurality of types of storage media.

The input interface 306 is connected to the input device 307 and is a circuit transmitting an input signal received from the input device 307 to the processor 301. The output interface 308 is connected to the output device 309 and is a circuit causing the output device 309 to execute output in accordance with an instruction by the processor 301. The communication interface 310 is a circuit controlling communication through a network 3. The communication interface 310 is, for example, a network interface card (NIC). The SAN interface 311 is a circuit controlling communication with a storage device connected to the computer 1 with a storage area network. The SAN interface 311 is, for example, a host bus adapter (HBA).

The input device 307 is a device transmitting the input signal in accordance with an operation. The input signal is, for example, a key device such as a keyboard and buttons that are mounted on a main body of a computer 1 or a pointing device such as a mouse and a touch panel. The output device 309 is a device outputting information in accordance with control by the computer 1. The output device 309 is, for example, an image output device (display device) such as a display or an audio output device such as a speaker. For example, an input and output device such as a touch screen is used as the input device 307 and the output device 309. The input device 307 and the output device 309 may be integrated with the computer 1 or may be, for example, devices connected to the computer 1 externally without being included in the computer 1.

For example, the processor 301 reads out the programs stored in the ROM 303 and the storage medium 305 into the RAM 302 and performs pieces of processing of the controllers 110 and 210 in accordance with procedures of the read programs. In this case, the RAM 302 is used as a work area of the processor 301. The ROM 303 and the storage medium 305 store therein program files (an application program 24, middleware 23, an OS 22, and the like, which will be described later) and data files (for example, the static dictionary 121, the two-dimensional hashed index 123, and the three-dimensional hashed index 124) and the RAM 302 is used as the work area of the processor 301 to implement the functions of the storage units 120 and 220. The programs that the processor 301 reads out will be described with reference to FIG. 15.

Figure 15:
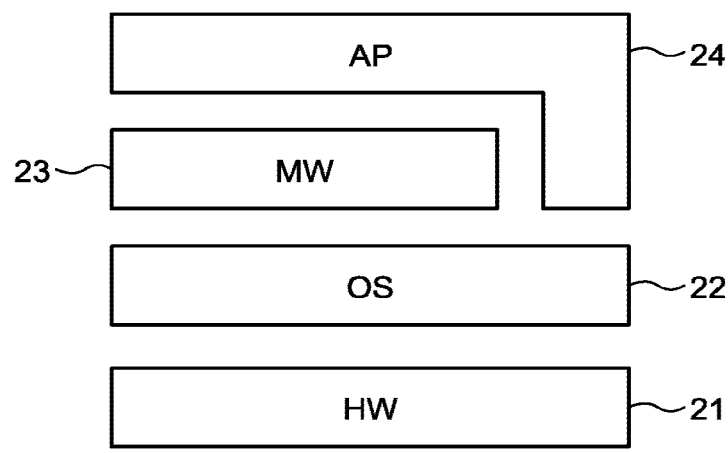
FIG. 15 is a diagram illustrating an example of the configuration of programs operating in a computer.

FIG. 15 is a diagram illustrating an example of the configuration of the programs operating in the computer. In the computer 1, the operating system (OS) 22 controlling a hardware group HW 21 (301 to 312) illustrated in FIG. 15 operates. The processor 301 operates with the procedures in accordance with the OS 22 to control and manage the hardware group HW 21, so that a hardware group 21 executes pieces of processing in accordance with the application program AP 24 or the middleware MW 23. Furthermore, in the computer 1, the middleware MW 23 or the application program AP 24 is read out into the RAM 302 to be executed by the processor 301.

The processor 301 performs pieces of processing based on at least a part of the middleware 23 or the application program 24 when the index generation function is called to implement the functions of the controller 110 (by controlling the hardware group 21 for the pieces of processing based on the OS 22). The processor 301 performs pieces of processing based on at least a part of the middleware 23 or the application program 24 when the retrieval function is called to implement the functions of the controller 210 (by controlling the hardware group 21 for the pieces of processing based on the OS 22). The coding function and the retrieval function may be included in the application program 24 itself or may be a part of the middleware 23 that is called to be executed in accordance with the application program 24.

Figure 16:
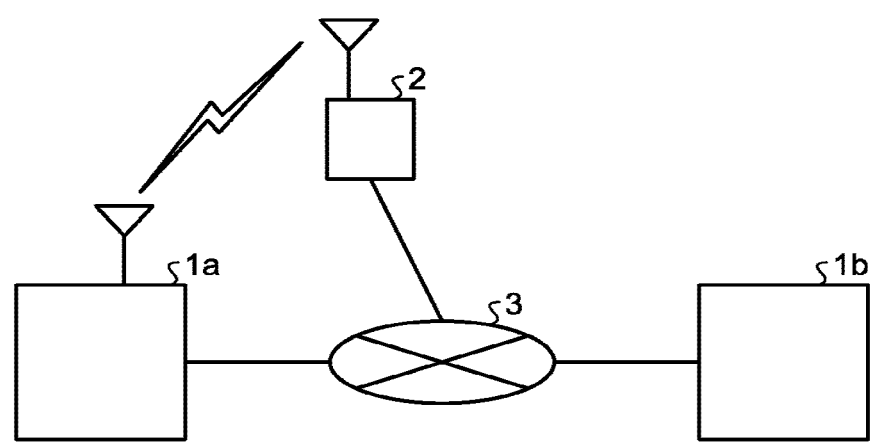
FIG. 16 is a diagram illustrating an example of the configuration of devices in a system in the embodiment.

FIG. 16 is a diagram illustrating an example of the configuration of devices in a system in the embodiment. The system in FIG. 16 includes a computer 1a, a computer 1b, a base station 2, and the network 3. The computer 1a is connected to the network 3 connected to the computer 1b wirelessly or by wire.

The index generation device 100 and the retrieval device 200 may be included in either of the computer 1a or the computer 1b illustrated in FIG. 16. The configuration in which the computer 1b has the functions of the index generation device 100 whereas the computer 1a has the functions of the retrieval device 200 or the configuration in which the computer 1a has the functions of the index generation device 100 whereas the computer 1b has the functions of the retrieval device 200 may be employed. Alternatively, both of the computer 1a and the computer 1b may have the functions of the index generation device 100 and the functions of the retrieval device 200.

According to one aspect, an index containing the files, the keys, and the appearance positions thereof can be easily generated in the compression format with one pass.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein a search program that causes a computer to execute a process comprising:

receiving a search request containing at least one word;

referring to a two-dimensional hashed index in a compression format that is generated based on the two-dimensional bitmap index including two hashed bitmaps obtained by hashing a two-dimensional bitmap index corresponding to word codes by two different bases, an X-axis of the two-dimensional bitmap index indicating a file identifier (ID) of target files and a Y-axis indicating the word codes;

indicating, by the two-dimensional bitmap index, whether each of the at least one word is present or absent in the plurality of input files;

referring to a three-dimensional hashed index in a compression format that is generated based on a three-dimensional bitmap index, including two hashed bitmaps obtained by hashing the three-dimensional bitmap index according to the positions of the words by two different bases, an X-axis of a three-dimensional bitmap index indicating positions of the words for respective files, a Y-axis of the three-dimensional bitmap index indicating the word code for respective plurality of words and a Z-axis of the three-dimensional bitmap index indicates the file ID for the respective files;

specifying a file including the at least one word in the search request based on the referral of the two-dimensional hashed index;

specifying an appearance position of the at least one word in the file specified at the first specifying based on the referral of the three-dimensional hashed index;

adding the appearance position of the at least one word to a value list together with the file ID and the word codes; and outputting the value list as a retrieval result.

2. The non-transitory computer readable recording medium according to claim 1, wherein the process further comprises:

when an appearance frequency of the at least one word is lower than a predetermined frequency, coding the at least one word based on a dynamic dictionary and registering the coded code in the dynamic dictionary; and generating index information in which the presence or the absence of the at least one word for each of the files and the position of the word corresponding to the code are associated with the code registered.

* * * * *